US008077560B2

(12) United States Patent
Ueda et al.

(10) Patent No.: US 8,077,560 B2
(45) Date of Patent: Dec. 13, 2011

(54) ADDITIONALLY RECORDABLE INFORMATION RECORDING MEDIUM, INFORMATION RECORDING METHOD, INFORMATION REPRODUCING METHOD, INFORMATION RECORDING APPARATUS AND INFORMATION REPRODUCING APPARATUS

(75) Inventors: Hiroshi Ueda, Kashiba (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/608,173

(22) Filed: Oct. 29, 2009

(65) Prior Publication Data

US 2010/0046341 A1 Feb. 25, 2010

Related U.S. Application Data

(63) Continuation of application No. 10/547,825, filed as application No. PCT/JP2004/002659 on Mar. 3, 2004, now Pat. No. 7,701,815.

(30) Foreign Application Priority Data

Mar. 3, 2003 (JP) .................................. 2003-056347

(51) Int. Cl.
*G11B 7/00* (2006.01)

(52) U.S. Cl. ....................................... 369/30.01; 369/94

(58) Field of Classification Search ................ 369/30.01, 369/94
See application file for complete search history.

(56) References Cited

U.S. PATENT DOCUMENTS

| | | | |
|---|---|---|---|
| 5,293,566 A | | 3/1994 | Satoh et al. |
| 5,559,777 A | * | 9/1996 | Maeda et al. ................ 369/47.5 |
| 6,226,241 B1 | | 5/2001 | D'Amato et al. |
| 7,701,815 B2 | * | 4/2010 | Ueda et al. ................... 369/47.1 |
| 2002/0060963 A1 | | 5/2002 | Kobayashi |
| 2002/0105865 A1 | | 8/2002 | Kusumoto et al. |
| 2002/0136134 A1 | | 9/2002 | Ito et al. |
| 2003/0002411 A1 | * | 1/2003 | Kuroda ...................... 369/47.54 |
| 2003/0002420 A1 | | 1/2003 | Yoon et al. |

FOREIGN PATENT DOCUMENTS

| | | |
|---|---|---|
| JP | 05-189868 A | 7/1993 |
| JP | 09-288883 | 11/1997 |
| JP | 10-021673 | 1/1998 |
| JP | 2000-149255 | 5/2000 |
| JP | 2001-014828 | 1/2001 |
| JP | 2001-291332 | 10/2001 |

OTHER PUBLICATIONS

International Search Report for corresponding Application No. PCT/JP2004/002659 mailed Apr. 20, 2004.
European Search Report for corresponding European Application No. 04716793.7 dated Jan. 18, 2011.

* cited by examiner

*Primary Examiner* — Will J Klimowicz
*Assistant Examiner* — Andrew Sasinowski
(74) *Attorney, Agent, or Firm* — Renner, Otto, Boisselle & Sklar, LLP

(57) ABSTRACT

An additionally recordable information recording medium has a complicated management structure for managing an unrecorded area. Therefore, there are problems that it takes a long time for a disk to startup and it is difficult to build a recording/reproducing system. The additionally recordable information recording medium according to the present invention includes a simple data structure for managing a location information for a recorded area located at the rearmost location in a user data area. An additionally recordable apparatus according to the present invention also includes means for updating the location information of the recorded area so that the recorded area located at the rearmost location in the user data area is always managed.

6 Claims, 15 Drawing Sheets

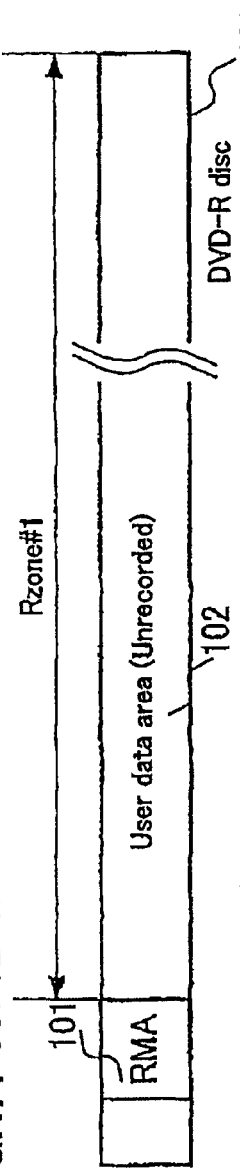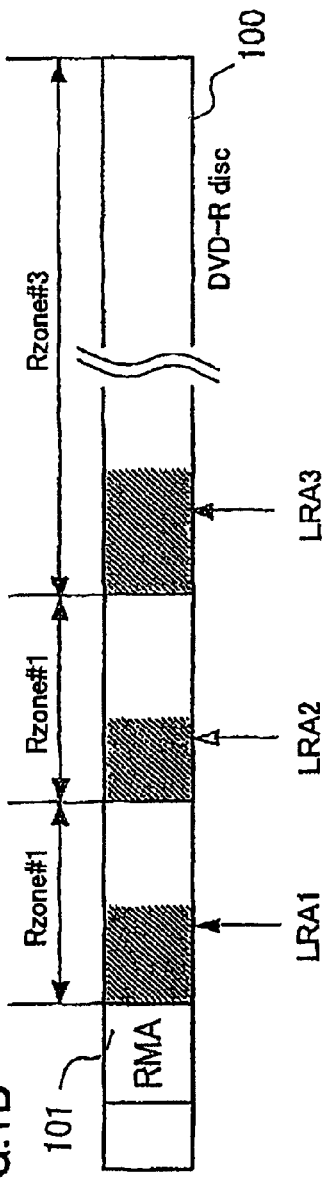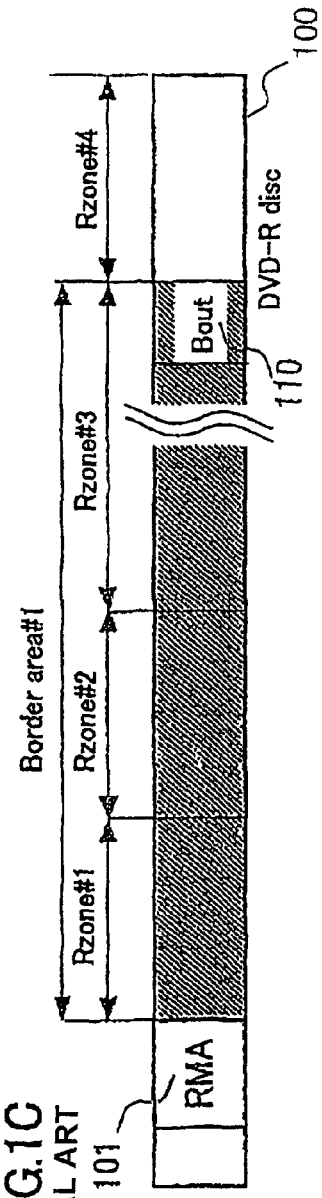

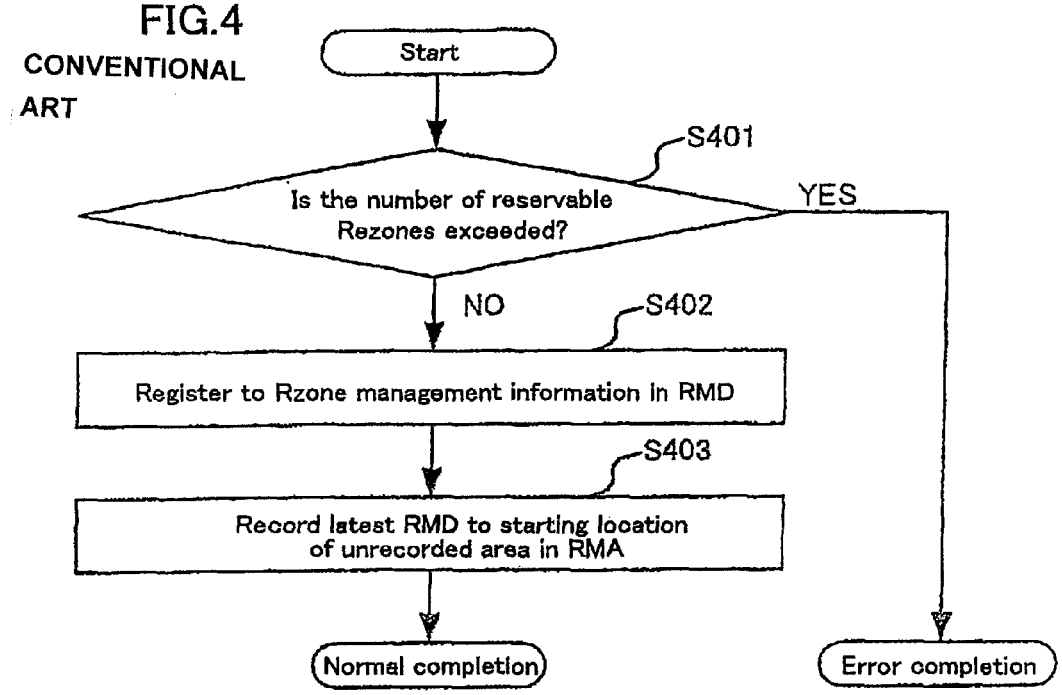

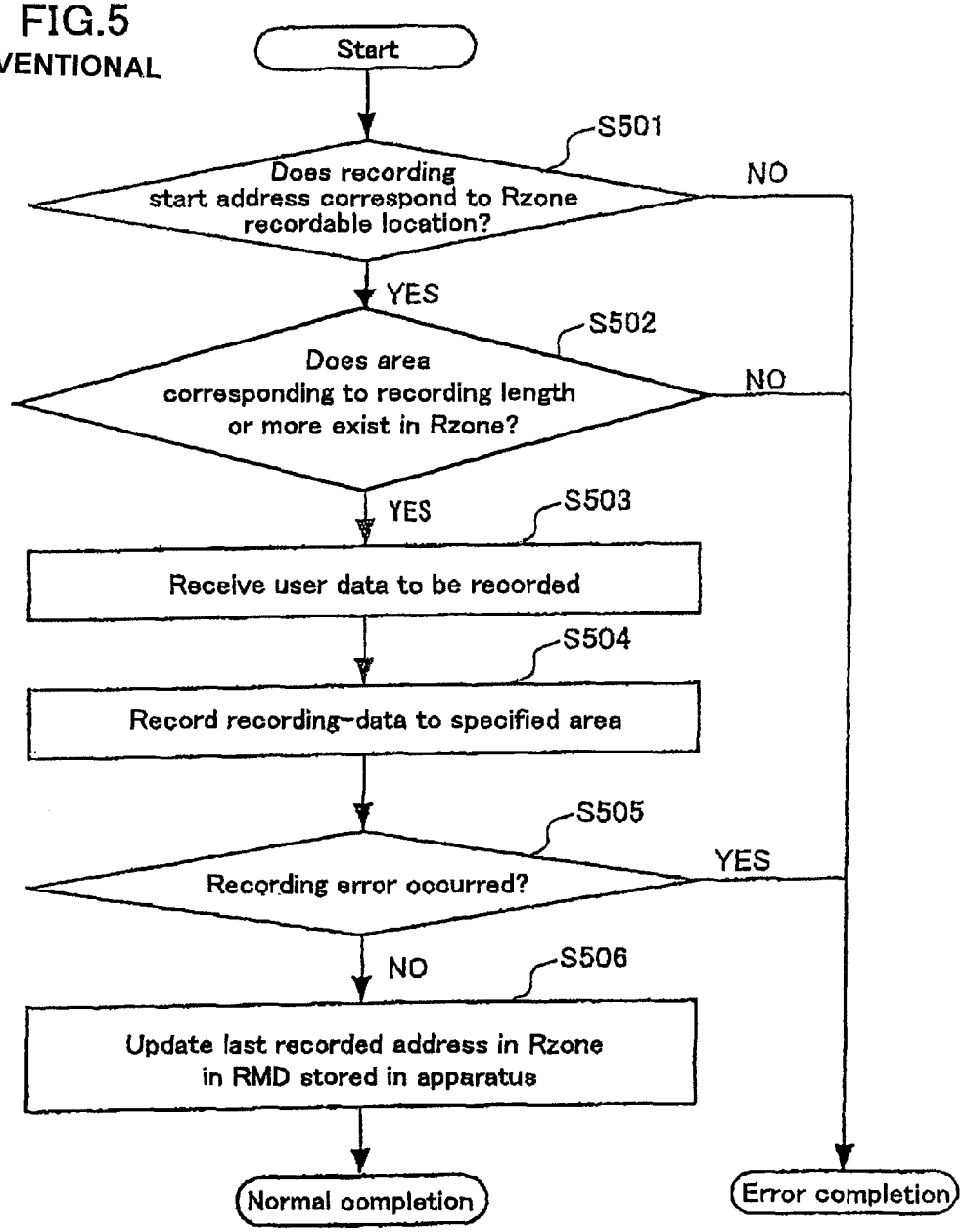

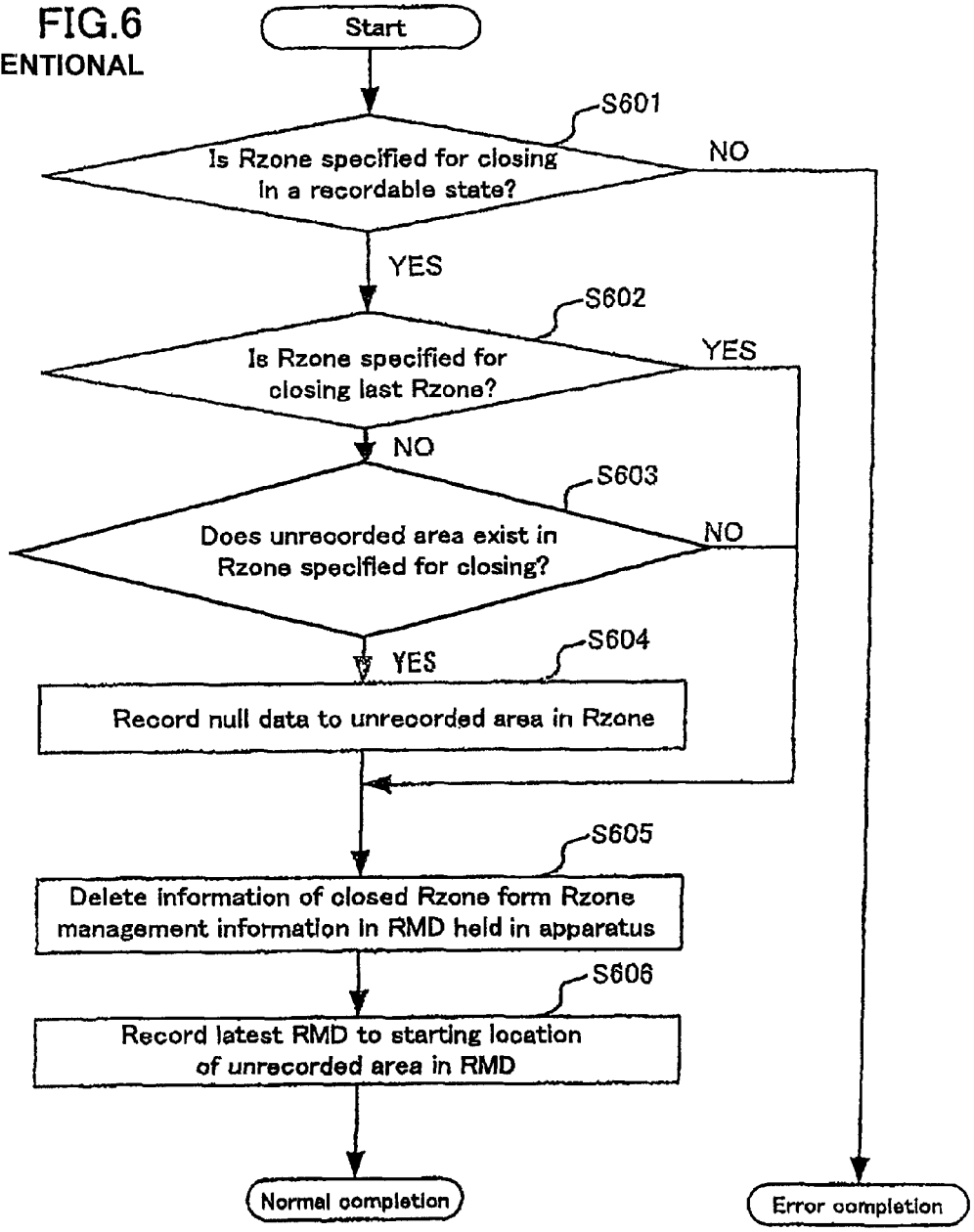

FIG.9A CONVENTIONAL ART

| Field Name | Content | 804 |
|---|---|---|
| VAT header | Logic volume identifier, Etc. | |
| File structure information | VAT entry 0: File group descriptor logic address | |
| | VAT entry 1: FF logic address for ROOT_DIR | |
| | VAT entry 2 to 473: Unused (All FFh) | |

FIG.9B CONVENTIONAL ART

| Field Name | Content | 812 |
|---|---|---|
| VAT header | Logic volume identifier, Etc. | |
| File structure information | VAT entry 0: File group descriptor logic address | |
| | VAT entry 1: FF logic address for ROOT_DIR | |
| | VAT entry 2: FE logic address for DIR_1 | |
| | VAT entry 3: FE logic address for FILE_A | |
| | VAT entry 4: FE logic address for FILE_B | |
| | VAT entries 5 to 473: Unused (All FFh) | |

FIG.9C CONVENTIONAL ART

| Field Name | Content | 820 |
|---|---|---|
| VAT header | Logic volume identifier, Etc. | |
| File structure information | VAT entry 0: File group descriptor logic address | |
| | VAT entry 1: FF logic address for ROOT_DIR | |
| | VAT entry 2: FE logic address for DIR_1 | |
| | VAT entry 3: FE logic address for FILE_A | |
| | VAT entry 4: FE logic address for FILE_B | |
| | VAT entry 5: FE logic address for DIR_2 | |
| | VAT entry 6: FE logic address for FILE_C | |
| | VAT entry 6: FE logic address for FILE_D | |
| | VAT entries 5 to 473: Unused (All FFh) | |

ADDITIONALLY RECORDABLE INFORMATION RECORDING MEDIUM, INFORMATION RECORDING METHOD, INFORMATION REPRODUCING METHOD, INFORMATION RECORDING APPARATUS AND INFORMATION REPRODUCING APPARATUS

This application is a continuation of U.S. Non-provisional application Ser. No. 10/547,825 filed Jan. 27, 2006 now U.S. Pat. No. 7,701,815 which is a 371 of International Application No. PCT/JP2004/002659 filed on Mar. 3, 2004, the contents of which are hereby incorporated by reference.

TECHNICAL FIELD

The present invention relates to an additionally recordable information recording medium in which data can be recorded in the same area only once, an information recording method, an information reproducing method, an information recording apparatus and an information reproducing apparatus.

BACKGROUND ART

Optical discs are available as information recording media having sector structures. In recent years, an AV data in audio and video are digitalized and higher-density and larger-capacity optical discs have been developed. The optical discs can be broadly classified into three types, depending on the characteristics thereof. First one is a reproduction-only disc in which data is recorded using bumps and pits of the disc and a user cannot record a new data. Second one is an additionally recordable disc that has a recording film of organic dye or the like to allow recording only once. Third one is a rewritable disc that has a recording film of a phase change material or the like to allow recording multiple times (i.e., rewriting).

In general, the additionally recordable discs are highly compatible with reproduction-only discs and can be manufactured at relatively low cost for the reason of manufacturing facilities, and thus have become increasingly widespread in recent years. As typical additionally recordable discs, DVD-R (Digital Versatile Disc Recordable) and CD-R (Compact Disc Recordable) are widely used.

However, an additionally recordable disc requires control specific to the additionally recordable disk since a recorded data and a management information thereof can not be written. Hereafter, an additionally recordable disk is described with reference to an example of a DVD-R disc.

FIGS. 1A to 1C are illustrations explaining a case in which data is recorded on a DVD-R disc multiple times.

FIG. 1A shows a data structure of a DVD-R disc 100 in which a user data area 102 for recording data specified by a user is in an unrecorded state. An RMA (Recording Management Area) located at an inner circumference portion is an area for managing the recording state of the user data area 102. In the DVD-R, additionally recordable areas are managed in areas called RZones (Reserved Zones). In FIG. 1A, an RZone #1 exists as only one additionally recordable area.

FIG. 1B shows a state in which three additionally recordable areas RZone #1, RZone #2, and RZone #3 are allotted. Portions indicated by hatching represent already-recorded areas. In this manner, when a recording operation in which unrecorded area is sandwiched is performed, a reserving operation for RZone is required in order to manage an additionally recordable location on the DVD-R disc. A start address for each RZone and an LRA (Last Recorded Address) indicating the last recorded location in each RZone are managed in an RMA 101. A border closing process is required in order that a disk shown in FIG. 1B is reproduced by a reproduction-only apparatus, such as DVD-ROM (Digital Versatile Disc Read Only Memory) drive. The border closing process is performed in order to avoid the restriction that the reproduction-only apparatus cannot access an unrecorded area on the disc.

FIG. 1C shows a data structure after the border closing process is performed. Data is recorded so that no unrecorded area exists in the RZones and a border-out (Bout) area 110 is recorded in an end of the border area. The border-out area 110 prevents the reproduction-only apparatus from improperly accessing an unrecorded area. An RZone #4 which is available for the next recording is generated subsequent to a border area #1 recorded as described above.

FIG. 2 shows a data structure for the RMA 101.

The RMA 101 is an area for storing RMDs (Recording Management Descriptors) for managing information on the RZones. The RMDs are updated when a new RZone is reserved or when the disc is ejected from the recording apparatus. Since a new RMD is updated in a subsequent area, a latest RMD 120 is recorded at the end of a recorded area (i.e., immediately prior to an unrecorded area).

The latest RMD 120 includes a disc identification information 121 for identifying a type of disc, an OPC (Optimum Power Calibration) information 122 for storing an adjustment result of recording power or the like, a border management information 123 for storing management information regarding a border and an RZone management information 124 for storing management information regarding an RZone.

The RZone management Information 124 stores information regarding each RZone. Hereafter, the case shown in FIG. 1B is used for describing the RZone management information 124. Since a last RZone number 125 stores the last RZone number allotted on the disc, "3" indicating a reserved RZone #3 is stored as an RZone number. "1" indicating a reserved RZone #1 and "2" indicating a reserved RZone #2 are respectively stored in a reserved RZone #1 number 126 and a reserved RZone #2 number 127. In a case of DVD-R, the number of reserved RZones that are not closed is limited to a maximum of 2. An address indicating the start location of the RZone #1 area is stored in an RZone #1 start address 128. An address indicating the last location of a recorded area in the RZone #1 is stored in an RZone #1 LRA 129. However, since the RZone #1 LRA 129 is not updated every time, there are some cases in which the RZone #1 LRA 129 does not match a last recorded location, e.g., a case in which power supplied to the recording apparatus is interrupted at unexpected timing. In such cases, based on the information in the RZone #1 LRA 129, the recording apparatus searches to determine whether or not a subsequent area is unrecorded to detect a true last recorded location. The start address and the last recorded address of the RZone #2 area are respectively stored in an RZone #2 start address 130 and an RZone #2 LRA 131.

FIG. 3 is a flowchart showing a process when a DVD-R disk, which is a conventional additionally recordable information recording medium, is loaded in a recording apparatus. Hereafter, details of the process are described with reference to the flow.

Upon determining that the loaded information storage medium is a DVD-R disc, the recording apparatus searches for the end of a recorded-area in the RMA area in order to obtain the latest RMD. Based on a reproduction signal or the like from the disc, the recording apparatus sequentially determines whether an area is a recorded area or an unrecorded area to search for a border between the recorded area and the unrecorded area (step S301).

Upon detecting the border between the recorded area and the unrecorded area, the recording apparatus determines that the last area of the recorded area is the latest RMD, and then executes a reading process (step S302).

Based on the content of the latest RMD area read from the disc, the recording apparatus determines whether or not the content of the latest RMD has an additionally recordable reserved RZone. When an additionally recordable reserved RZone is detected, the process proceeds to step S304, and when an additionally recordable reserved RZone is not detected, the process proceeds to step S305 (step S303).

When an additionally recordable reserved RZone is detected in step S303, the recording apparatus searches for a subsequent area from the LRA of the reserved RZone. This is intended to obtain a true last recorded location by searching for the subsequent area since an LRA may not correspond to a true last recorded location as described above. The recording apparatus internally stores, as a true LRA, an address of an area immediately prior to the border between the recorded area and the unrecorded area, the border being initially detected in the area subsequent to the LRA. Thereafter, the process proceeds to step S303 in order to determine whether or not another additionally recordable reserved RZone exists (step S304).

The recording apparatus which has completed the LRA searching in all reserved Rzones performs as last step an LRA searching in the last RZone. In an area subsequent to the LRA stored in the latest RMD, the recording apparatus searches for the border between the recorded area and the unrecorded area, as in the same way as the process in step S304, and detects a true LRA and internally store the true LRA (step S305).

Due to the process flow described above, the recording apparatus obtains all recordable addresses on the disc and internally stores the addresses.

FIG. 4 is a flowchart showing a process for newly reserving an RZone for managing a recorded location. Hereafter, details of the process will be described with reference to the flow. In the following description, the recording apparatus receives an RZone reserving instruction from a high-order controlling means such as a personal computer and an area length of an RZone to be reserved.

The recording apparatus which has received a new RZone reserving instruction determines whether or not the number of new RZone reserving instructions does not exceed a predetermined number of reservable RZones (up to two in case of a DVD-R disc). When it is determined that reserving a new RZone causes the number of reservable RZones to be exceeded, the process completes as error. When it is determined that reserving a new RZone does not cause the number of reservable RZones to be exceeded, the process proceeds to step S402 and the RZone reservation process continues (step S401).

The recording apparatus secures an RZone area length specified by the high-order controlling means at a first portion in the last RZone. The starting location of the last RZone is also updated so as to be subsequent to the area reserved as a newly reserved RZone. The recording apparatus performs reading from the disc, stores the start address of the newly reserved RZone and the LRA in the internally stored RMD information and updates the start address of the last RZone (step S402).

The recording apparatus records the RMD which is updated in step S402 at the start area of an unrecorded area in the RMA, i.e., an area immediately subsequent to the latest RMA (step S403).

As described above, the recording apparatus updates the content of the RMD upon receiving a new RZone reserving instruction.

FIG. 5 is a flowchart showing a recording procedure for recording a user data to a user data area 102 of the DVD-R disc illustrated in FIGS. 1A to 1C and 2. Hereafter, details of the process will be described below with reference to the flow. In the following description, the recording apparatus receives a recording start address, at which the user data is recorded, and a recording length, which indicates the data length of data to be recorded, as a control information from the high-order controlling means such as a personal computer. The recording apparatus refers to an internally held RMD information to determine whether or not the recording start address instructed by the high-order controlling means matches the recordable address of either an additionally recordable reserved RZone or the last RZone. Herein, the recordable address refers to an address of an area immediately subsequent to the last recorded address. When the recording start address instructed by the high-order controlling means does not match the recordable address of any of the additionally recordable RZones, the process completes as error. On the other hand, when the recording start address matches the recordable address of any of the additionally recordable RZones, the process proceeds to step S502 (step S501).

The recording apparatus refers to the Internally held RMD information to determine whether or not an additionally recordable area corresponding to the specified recording length remains in the additionally recordable RZone requested for recording. When an additionally recordable area corresponding to the specified recording length or more exists, the process proceeds to stop 6503, and when an additionally recordable area corresponding to the specified recording length or more does not exist, the process completes as error (step S502).

The recording apparatus receives the user data to be recorded from the high-order controlling means and records the transferred a user data to an area subsequent to the specified recording start address (steps S503 and S504).

When an unrecoverable error occurs In the recording process in step S504, the process completes as error. On the other hand, when no error occurs and all the specified user data is recorded, the process proceeds to step S506 (step S505).

When all user data transferred from all the high-order controlling means are properly recorded in step S505, the recording apparatus updates the RMD information stored in the memory of the apparatus. The last recorded address (LRA) of the RZone to which the user data was recorded is updated here (step S506).

As described above, the recording apparatus performs recording to an area subsequent to the additionally recordable location and updates the last recorded address of a recorded RZone. In step S506, the updated RMD information may be recorded on the disc. In general, however, due to the reasons of performance involving time required for recording and of a reduction in RMA area consumption, the RMD Information stored in the apparatus is recorded on the disc at timing such as during discharge of the disc.

FIG. 6 is a flowchart showing a process procedure for closing an RZone of the DVD-R disc illustrated in FIGS. 1A to 1C and 2. Hereafter, details of the process will be described with reference to the flow. In the following description, a closing instruction command and an RZone number to be closed as a control information are transferred from a high-order controlling means such as a personal computer.

Upon receiving the RZone closing instruction from the high-order controlling means, the recording apparatus determines whether or not the specified RZone is in an additionally recordable state. When it is determined that the specified RZone is in an additionally recordable state, the process proceeds to step S602 and the closing process continues. When it is determined that the specified RZone is not in an additionally recordable state, the closing process completes as error (step S601).

The recording apparatus refers to the RMD information stored in the apparatus to determine whether the RZone number for which the closing instruction was issued from the high-order controlling means corresponds to the last RZone or a reserved RZone. When it is determined that the closing instruction is for a reserved RZone, the process proceeds to step 6603, and when it is determined the closing instruction is for the last RZone, the process proceeds to step S605 (step S602).

The recording apparatus determines whether or not an unrecorded area exists in the RZone for which the closing instruction was issued. When an unrecorded area exists, the process proceeds to step S604, and when an unrecorded area does not exist, the process proceeds to step S605 (step S603).

In steps S602 and S603, when it is determined that the RZone for which the closing instruction was issued from the high-order controlling means is a reserved RZone and an unrecorded area exists in the reserved RZone, the recording apparatus records a NULL data (data for setting all user data to "0") to all unrecorded areas in the reserved RZone for which the closing instruction was issued (step S604).

The RZone to be closed is deleted from the management of RZones in the RMD stored in the recording apparatus. Herein, the RZone deletion means, when a closed RZone is a reserved RZone, setting "0" in a reserved RZone number area in the RZone management information. When a closed RZone is the last RZone, the RZone deletion means setting the last RZone number area to a value increased by "1". For example, in FIG. 2, when a reserved RZone #1 is closed, the reserved RZone #1 number 126 is set to "0". As another example, in a case in which "3" is stored in the last RZone number 125, when an RZone number 3 to closed, the last RZone number 125 is set to "4". Through the process as in the above-described examples, the information of the closed RZone is deleted from the RMD (step S605).

The recording apparatus records the RMD updated in step S605 in an unrecorded-area start area in the RMA i.e., an area immediately subsequent to the latest RMD, on the disc (step S606).

As described above, the recording apparatus performs the RZone closing process so that that any unrecorded area does not remain in the RZone.

Next, how a recorded user data is managed at the file system level in a conventional recording method will be described with reference to FIGS. 7A, 7B and 8.

FIGS. 7A and 7B show examples of files and directories to be recorded on the disc.

FIG. 7A shows an example in which a DIR-1 directory exists in a root directory and two files, namely, a FILE_A and a FILE_B further exist in the DIR_1 directory. FIG. 7B shows a structure in which a new DIR_2 directory is created in the root directory and two files, namely, a FILE_C and a FILE_D are added to the DIR_2 directory.

FIG. 8 is a layout view for illustrating a data structure of a file/directory management information for managing the file and directory structures shown in FIGS. 7A and 7B. A volume space structure is recorded in a volume structure 801. A file group descriptor 802 and a file entry 803 for the root directory (ROOT_DIR) are recorded in a file structure/file area 829. A VAT (Virtual Allocation Table) 804, which describes the allocation of a virtual logic address and a VAT ICB 805 which indicates a VAT recording location are recorded in a VAT structure 830. A VAT structure 832 and a VAT structure 834 are recorded in order to update the file management information when a directory and a file are additionally recorded.

When directories and files as shown In FIG. 7A are recorded, data for the volume structure 801 in the volume structure, the file structure/file area 829, the VAT structure 830, the file structure/file area 831, and the VAT structure 832 shown in FIG. 8 are recorded, and a file structure/file area 833 and the VAT structure 834 are unrecorded areas. The file structure/file area 831 contains a FILE_A 806 which is the file data of the file "FILE_A", a FILE_A file entry 807 which stores the recording location and file attribute of the file data of the "FILE_A", a FILE_B 808 which is the file data of the file "FILE_B", a FILE_B file entry 809 which stores the recording location and file attribute of the file data of the "FILE_B", a "DIR_1" file entry 810 which stores information regarding the directory "DIR_1" and a "ROOT_DIR" file entry 811 which stores information regarding the root directory "ROOT_DIR". Virtual addresses for the file entries stored in the file structure/file area 831 are stored in the VAT structure 832, which will be described later.

Next, when a directory "DIR_2", a file "FILE_C", and a "FILE_D" as shown in FIG. 7B are additionally recorded, the file structure/file area 833 and the VAT structure 834 are additionally recorded to the disc. The file structure/file area 833 contains a FILE_C 814 which is the file data of the file "FILE_C", a FILE_C file entry 815 which stores the recording location and file attribute of the file data of the "FILE_C", a FILE_D 816 which is the file data of the file "FILE_D", a FILE_D file entry 817 which stores the recording location and file attribute of the file data of the "FILE_D", a "DIR_2" file entry 818 which stores information regarding the directory "DIR_2" and a "ROOT_DIR" file entry 819 which stores information regarding the root directory "ROOT_DIR". Virtual addresses for the file entries stored in the file structure/file area 833 are stored in the VAT structure 834.

As described above, in the UDF file system, when a new file and a directory are added to an additionally recordable disc, the information of the added file and directory and a VAT structure for storing a location information for obtaining the information can be updated and recorded. Furthermore, since the VAT structure is arranged at the end of a recorded area (i.e., immediately prior to an unrecorded area), a recording/reproducing apparatus can obtain the latest VAT structure (the VAT structure 834 in FIG. 8) to obtain a directory and file information.

FIGS. 9A to 9C show the respective data structures of the VAT 804, a VAT 812 and a VAT 820 shown in FIG. 8.

FIG. 9A shows a data layout of the VAT 804 before any directory or file is recorded. The VAT 804 contains only the logic address of a file entry for the "ROOT_DIR" as file entries for directories and files.

FIG. 9B is a data layout of the VAT 812 after the directory "DIR_1" is recorded. The VAT 812 respectively contains a file entry logic address for the "DIR_1", a file entry logic address for the "FILE_A" and a file entry logic address for the "FILE_B" in respective VAT entries 2 to 4. Thus, obtaining the VAT 812 makes it possible to obtain the recording locations (logic addresses) of file entry information of files and directories stored in the file structure/file area 831.

FIG. 9C shows a data layout of the VAT 820 after the directory "DIR_2" is recorded. The VAT 820 respectively contains a file entry logic address for the "DIR_2", a file entry logic address for the "FILE_C" and a file entry logic address for the "FILE_D" are contained in respective VAT entries 5 to 7 in addition to the data structure of the VAT 812.

As described above, in the DVD-R which is a conventional additionally recordable disc, an additional file recording is achieved by recording the VAT structure, which is an address conversion table for obtaining file and directory information for the end of a recorded area every time an additional recording process is performed.

However, as described in the example of the DVD-R disc, in order to manage a disc having multiple additional recording points, it is necessary to manage a special data structure called the RZones, thus requiring extremely complicated data management. Therefore, the recording apparatus needs to mount functions, such as an RZone reservation process, a closing process and an RZone-state management process. For example, when a DVD-R recording apparatus is used with a personal computer, the user must execute a special dedicated application corresponding to the RZone management in order to perform recording.

Another problem is that the startup time is increased since the recording apparatus searches for additionally recordable areas in all RZone as described with reference to the process flow of the recording apparatus when a disc is loaded shown in FIG. 3.

A further problem is that all the data structures recorded on the disc can be managed at the file system level as described with reference to FIGS. 8 and 9A to 9C, but is redundantly managed together with an area management using RZones. Therefore, the entire system tends to be complicated.

The present invention solves the above-described problems. The objective thereof is to provide an information recording medium for managing only one recorded-area end location on a disc, a recording apparatus for recording information to the information recording medium and an information reproducing apparatus for reproducing the information on the information recording medium.

DISCLOSURE OF THE INVENTION

An information recording method according to the present invention to an information recording method for recording data on an additionally recordable information recording medium. The additionally recordable information recording medium includes a user data area for recording a user data and a control information area for recording a control information. The information recording method includes: a step of determining whether or not recording of the user data is started from a predetermined location rearwardly away from an end of a recorded area located in the rearmost location in the user data area, of at least one recorded area in the user data area, before the user data is recorded in the user data area; and a step of recording the user data from the predetermined location when it is determined that the recording of the user data is started from the predetermined location and updating a latest recorded-area location indicating the location of the recorded area located at the rearmost location in the user data area, thereby achieving the above-described objective.

The control information area may include a recorded-area-location storage area for storing the latest recorded-area location. The stop of updating the latest recorded-area location may include a step of detecting a border between a recorded area and an unrecorded area in the recorded-area-location storage area, and a step of recording the latest recorded-area location in an unrecorded area immediately subsequent to the detected border.

The control information area may further include a backup area for compensating for a shortage in the recorded-area-location storage area; and the step of updating the latest recorded-area location may include a step of determining whether or not the entire area of the recorded-area-location storage area is used, and a step of recording the latest recorded-area location in the backup area when it is determined that the entire area of the recorded-area-location storage area is used.

An information recording apparatus of the present invention is an information recording apparatus for recording data on an additionally recordable information recording medium. The information recording apparatus includes a user data area for recording a user data and a control information area for recording a control information. The information recording apparatus includes: a determining means for determining whether or not recording of the user data is started from a predetermined location rearwardly away from an end of a recorded area located in the rearmost location in the user data area, of at least one recorded area in the user data area, before the user data is recorded in the user data area; and an updating means for recording, when it is determined that the recording of the user data is started from the predetermined location, the user data from the predetermined location and updating a latest recorded-area location indicating the location of the recorded area located at the rearmost location in the user data area, thereby achieving the above-described objective.

The control information area may include a recorded-area-location storage area for storing the latest recorded-area location. Further, the updating means may include means for detecting a border between a recorded area and an unrecorded area in the recorded-area-location storage area, and means for recording the latest recorded-area location in an unrecorded area immediately subsequent to the detected border.

The control information area may further include a backup area for compensating for a shortage in the recorded-area-location storage area; and the updating means may include means for determining whether or not the entire area of the recorded-area-location storage area is used, and means for recording the latest recorded-area location in the backup area when it is determined that the entire area of the recorded-area-location storage area is used.

An additionally recordable information recording medium of the present invention is an additionally recordable information recording medium having a user data area for recording user date and a control information area for recording a control information. Of at least one recorded area in the user data area, a latest recorded-area location indicating the location of a recorded area located at the rearmost location in the user data area is recorded in the control information area, thereby achieving the above-described objective.

The additionally recordable information recording medium may include a first recording layer and a second recording layer, and the user data area may be defined as a single user data area that virtually continues across the first recording layer and the second recording layer.

An information reproducing method is an information reproducing method for reproducing data recorded in an additionally recordable information recording medium. The additionally recordable information recording medium includes a user data area for recording a user data and a control information area for recording a control information. A latest recorded-area location indicating the location of a recorded area located at the rearmost location in the user data area, of at least one recorded area in the user data area, is recorded in the control information area. The information reproducing method includes: a step of obtaining the latest recorded-area location recorded in the control information area; and a step of searching for an end of the recorded area located at the rearmost location in the user data area based on the latest recorded-area location, thereby achieving the above-described objective.

An information reproducing apparatus of the present invention in an information reproducing apparatus for reproducing data recorded in an additionally recordable information recording medium. The additionally recordable information recording medium includes a user data area for recording user data and a control information area for recording a control information. A latest recorded-area location indicating the location of a recorded area located at the rearmost location in the user data area, of at least one recorded area in the user data area, is recorded in the control information area. The information reproducing apparatus include: means for obtaining the latest recorded-area location recorded in the control information area; and means for searching for an end of the recorded area located at the rearmost location in the user data area, in accordance with the latest recorded-area location, thereby achieving the above-described objective.

BRIEF DESCRIPTION OF THE DRAWINGS

FIGS. 1A to 1C are explanation drawings illustrating a recording procedure in a conventional DVD-R.

FIG. 4 is a flowchart illustrating a process for reserving an RZone in the conventional DVD-R.

FIG. 5 is a flowchart illustrating a recording process procedure in the conventional DVD-R.

FIG. 6 is a flowchart illustrating a close-processing procedure for an RZone in the conventional DVD-R.

FIGS. 9A to 9C are data layouts each showing the data structure of a VAT structure in the UDF file system.

BEST MODE FOR CARRYING OUT THE INVENTION

First Embodiment

Hereafter, an embodiment of an additionally recordable information recording medium according to the present invention will be described with reference to FIG. 10.

An additionally recordable information recording medium 1000 includes a lead-in area, a user data area for recording a user data and a lead-out area. The lead-in area and the lead-out area are control information areas for recording a control information. The additionally recordable information recording medium 1000 capable of randomly accessing the user data area.

The lead-in area includes a recorded-area-location storage area 1001 for storing a location (address) of a recorded area on the additionally recordable information recording medium (e.g., a disc) 1000.

The recorded-area-location storage area 1001 stores a recorded-area location indicating a location of a recorded area in the user data area. For example, when the additionally recordable information recording medium 1001 is discharged (ejected) from a recording apparatus, the recorded-area location is recorded in the recorded-area-location storage area 1001. Alternatively, when the recording apparatus receives a recording instruction for starting recording of the user data from a location away from the end of a last recorded area in the user data area (I.e., a recording instruction that results in two recorded areas sandwiching an unrecorded area, when the user data is recorded in accordance with the recording Instruction), the recorded-area location is recorded in the recorded-area-location storage area 1001.

The recorded-area location is updated by detecting the border between the recorded area and the unrecorded area in the recorded-area-location storage area 1001 and recording a latest recorded-area location 1010 in an unrecorded area immediately subsequent to the detected border. Thus, the latest recorded-area location 1010 is arranged at the end portion of a recorded area in the recorded-area-location storage area 1001. Recorded area locations (e.g., a recorded-area location #0, a recorded-area location #1, . . . and so on) other than the latest recorded-area location 1010 indicate the information of old locations in the recorded-area-location storage area 1001 and thus are invalid.

Figure 2:
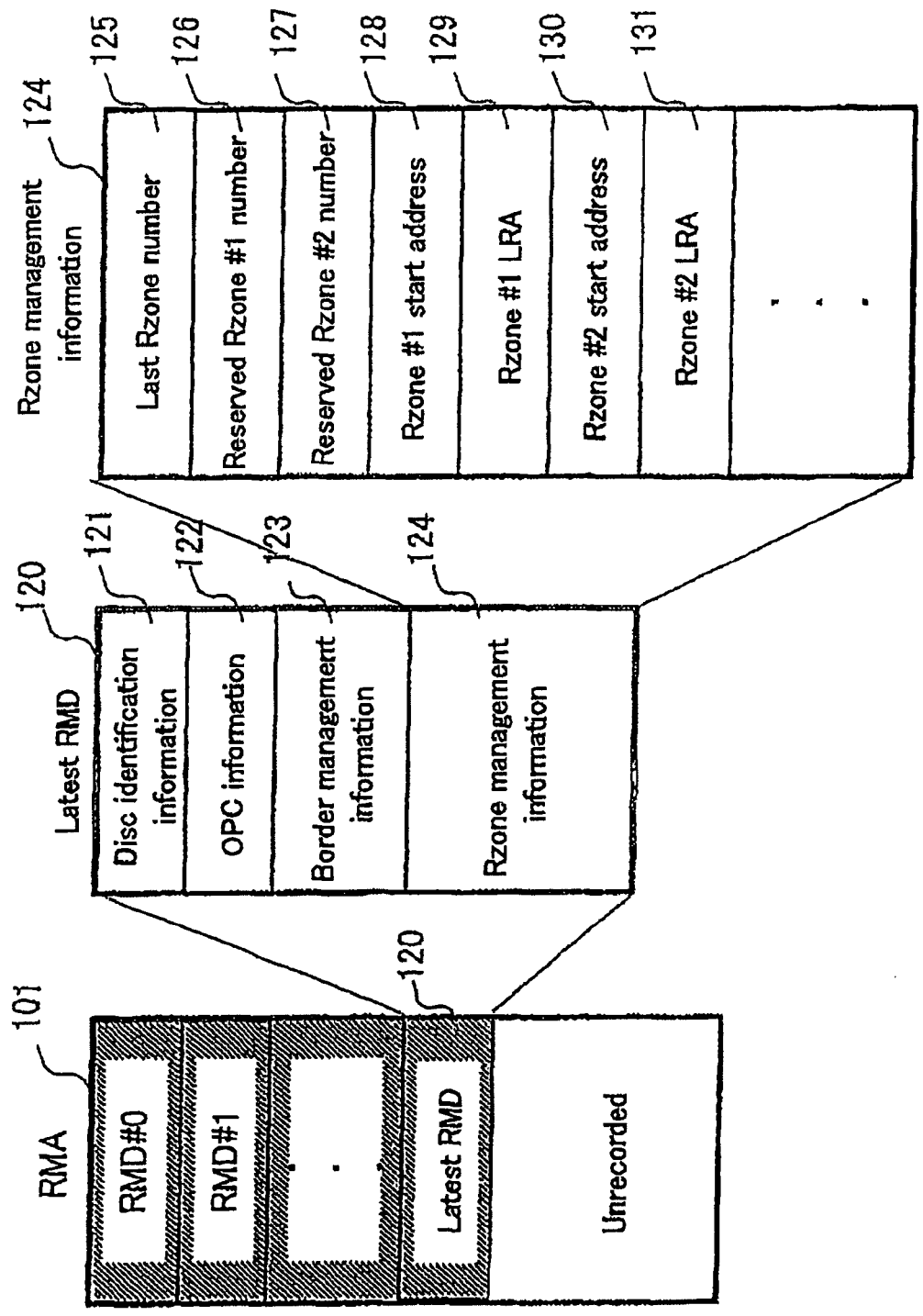
FIG. 2 is a data layout of an RMA in the conventional DVD-R.
Figure 3:
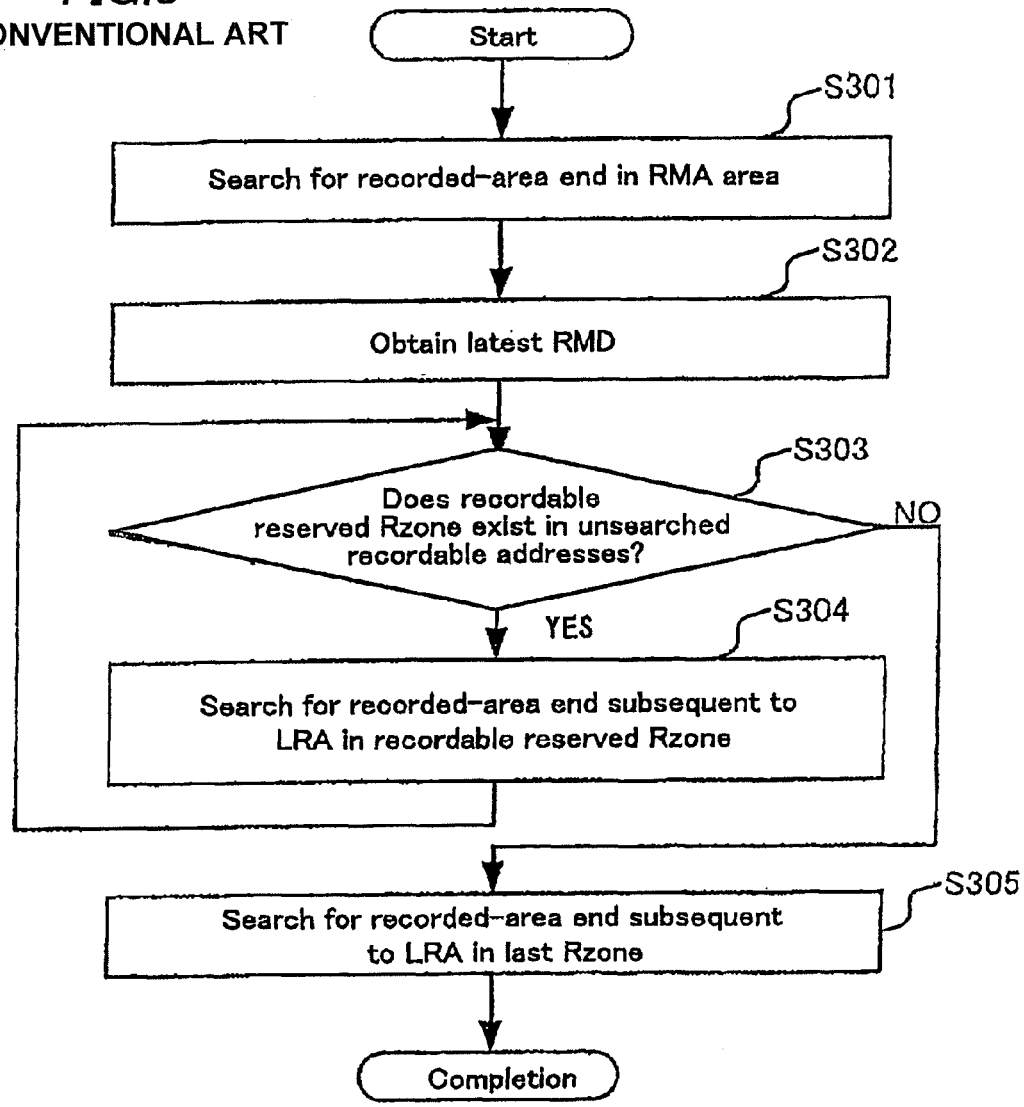
FIG. 3 is a flowchart illustrating a startup processing for the conventional DVD-R.
Figure 7A:
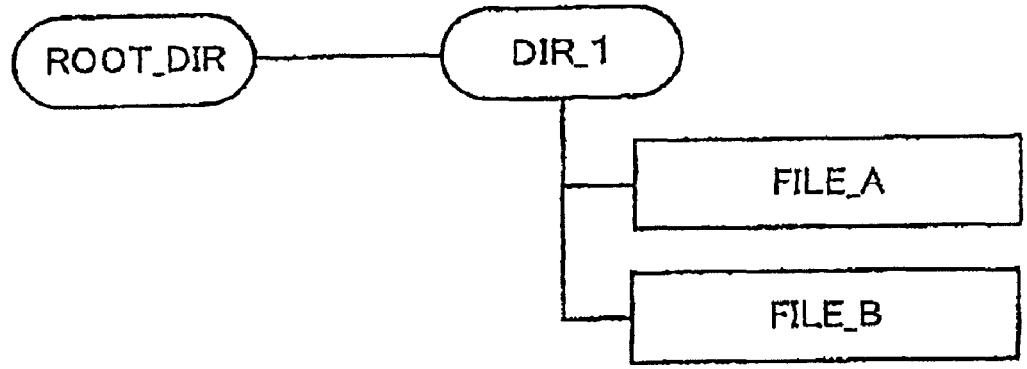
FIGS. 7A and 7B are explanation drawings illustrating examples of a directory/file structure for illustrating a UDF file system.
Figure 7B:
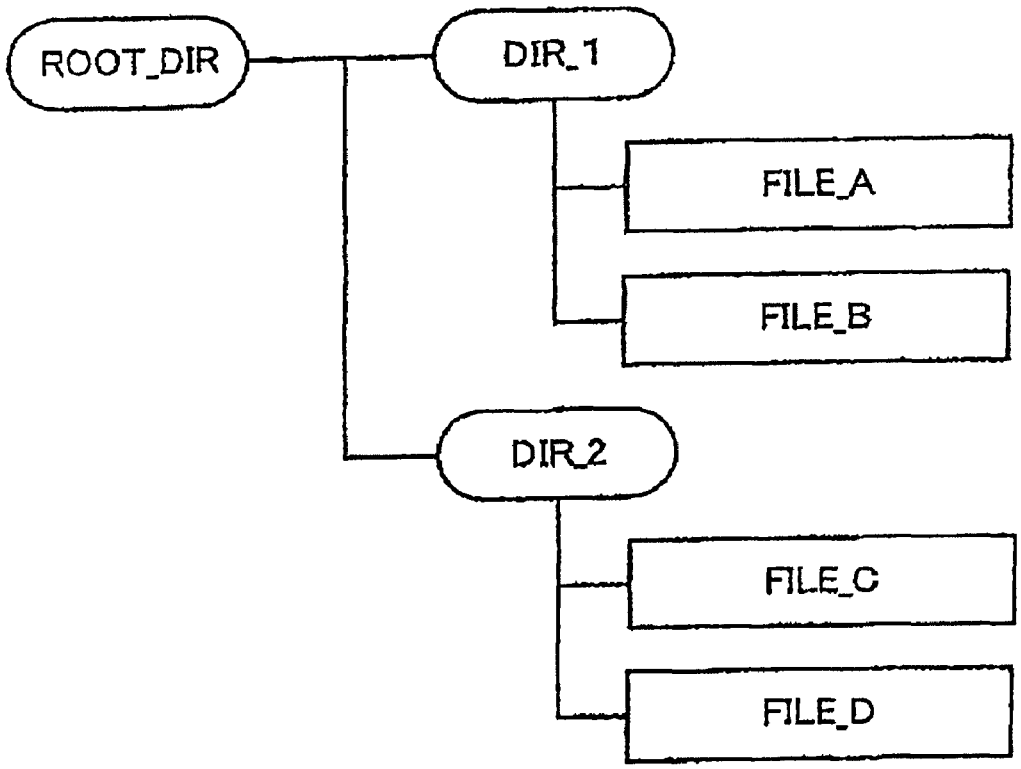
Figure 8:
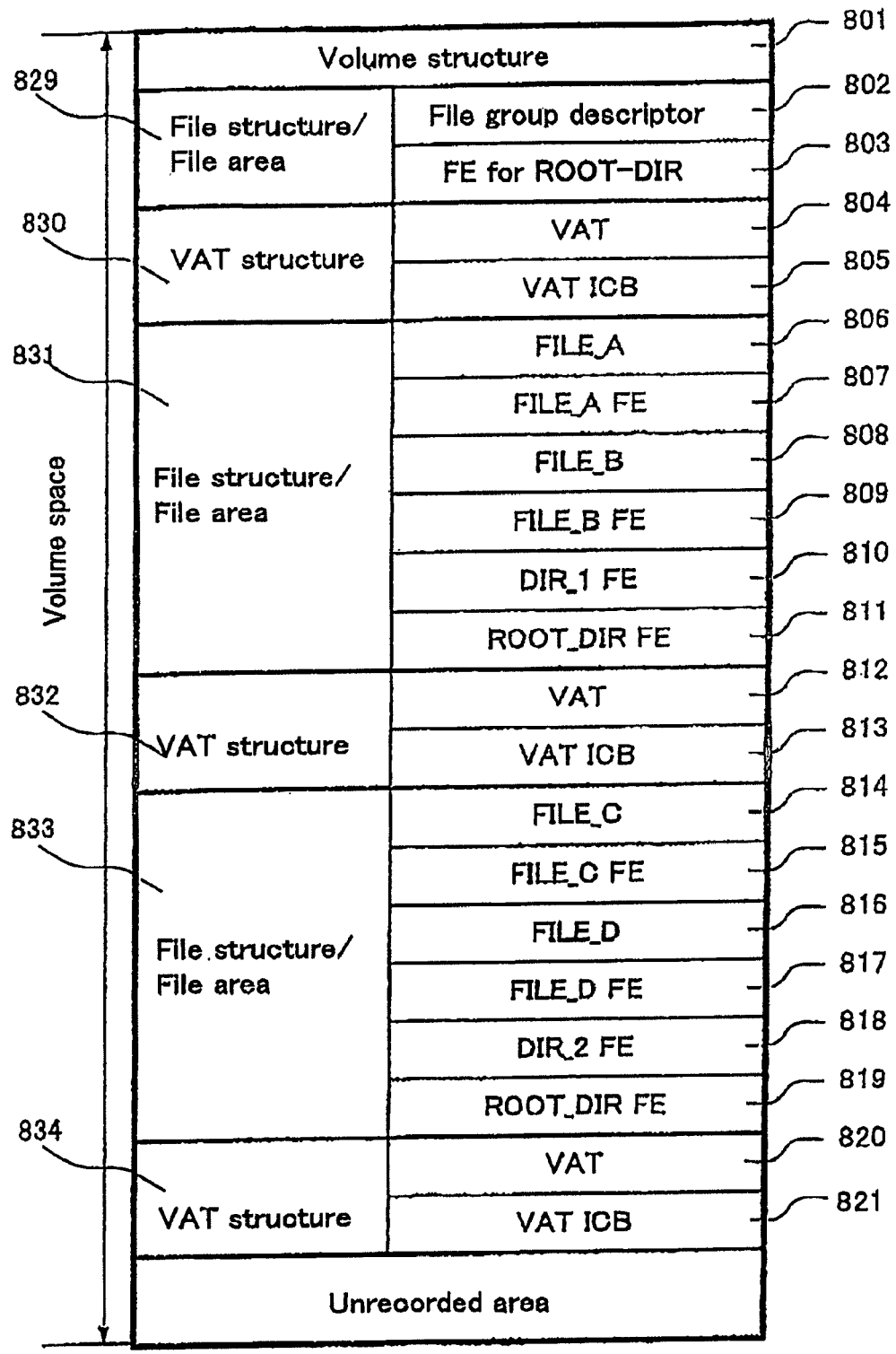
FIG. 8 is a data layout showing a data structure of a file management structure for illustrating the UDF file system.
Figure 10:
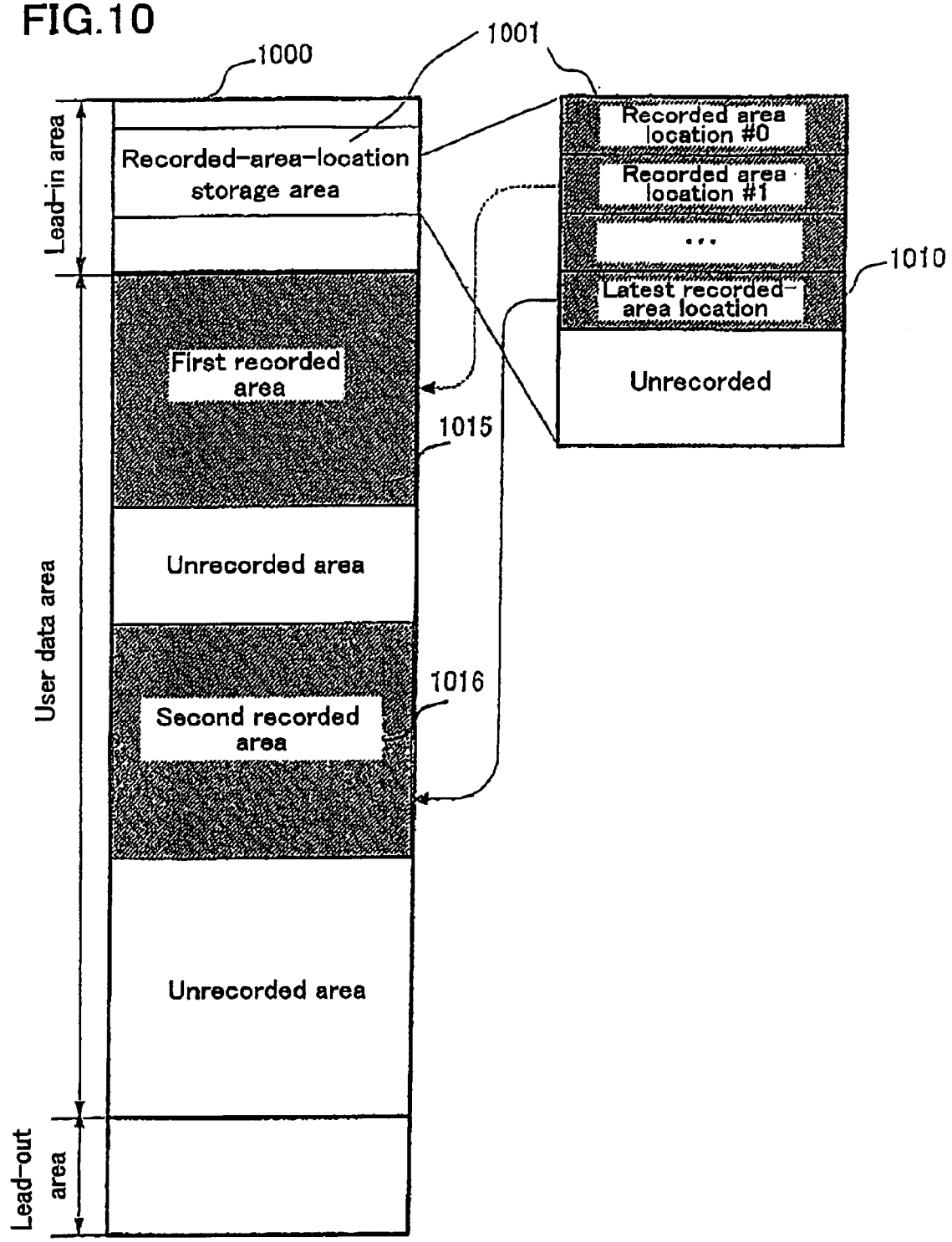
FIG. 10 is an explanation drawing illustrating a data structure of an additionally recordable information recording medium according to the present invention.

FIG. 10 shows a state in which the user data is recorded in a first recorded area 1015 and a second recorded area 1016 in the user data area of the additionally recordable information recording medium 1000.

In the example shown in FIG. 10, from a state in which the entire user data area is an unrecorded area, first, a first user data is recorded in the unrecorded area in the user data area, and then a second user data is recorded in the unrecorded area in the user data area. The area in which the first user data is recorded is referred to as the "first recorded area 1015". The area in which the second user data is recorded is referred to as the "second recorded area 1016".

When the recording of the first user data is started from the state in which the entire user data area is an unrecorded area, the recording apparatus records the location at which the recording of the first user data is started (i.e., the start location of the first recorded area 1015) at a recorded area location #0, and then starts a recording operation. Thereafter, when recording of the second user data is started from the state in which the first user data is recorded in the first recorded area 1015, the recording apparatus determines whether or not the recording of the second user data is started at a location away from the end of the first recorded area 1015 (i.e., whether or not an unrecorded area exists between the first recorded area 1015 and the second recorded area 1016 as a result of the recording of the second user data). Upon determining that the recording of the second data is started at a location away from the end of the first recorded area 1015 (i.e., upon determining that an unrecorded area exists between the first recorded area 1015 and the second recorded area 1016 as a result of the recording of the second user data), the recording apparatus records the location at which the recording of the second user data is started (i.e., the start location of the second recorded area 1016) at the recorded area location #1.

In this manner, when the recording apparatus starts the recording of a user data at a location rearwardly away from the end of the last recorded area in the user data area, the recording apparatus records a latest recorded-area location, indicating the location of the last recorded area, in the recorded-area-location storage area 1001. As a result, the latest recorded-area location is updated in the recorded-area-location storage area 1001.

Herein, the "last recorded area" refers to a recorded area located at the rearmost location in at least one recorded area in the user data area.

Herein, the direction of accessing the user data area (e.g., a direction for searching for an unrecorded area in the user data area) is defined as a direction from the "forward direction" in the user data area toward the "rearward direction" in the user data area. In the example shown in FIG. 10, the direction for searching for an unrecorded area in the user data area is a direction from the lead-in area toward the lead-out area. The side closer to the lead-in area (the side farther from the lead-out area) corresponds to the "forward direction" in the user data area and the side farther from the lead-in area (the side closer to the lead-out area) corresponds to the "rearward direction" in the user date area.

The "location of the last recorded area" indicated by the latest recorded-area location may be a location at which the recording of the user data is started (I.e., the starting location of a recorded area), may be a location at which the recording of the user data is finished (i.e., the end location of a recorded area) or may be any location between the start location of a recorded area and the end location of the recorded area. As the location of the last recorded area, any location that allows to identify the last recorded area of at least one recorded area in the user data area can be used.

As described above, in the additionally recordable information recording medium 1000, the latest recorded-area location indicating the location of a recorded area located at the rearmost location in the user data area, of at least one recorded area in the user data area is stored in the recorded-area-location storage area 1001. This makes it possible to easily search for the end of a recorded area located at the rearmost location in the user data area.

Information indicating a recorded area other than the recorded area located at the rearmost location in the user data area is not stored in the recorded-area-location storage area 1001. In this manner, only one pointer indicating a recorded area in the user data area is sufficient for the user data area.

Also, arranging the VAT structure, described with reference to FIGS. 8 and 9A to 9C, at the end of a recorded area (or a location adjacent to the end) allows for management of a recorded directory and file data. In addition, since the RZone management is not required unlike the DVD-R described in the related art, the recording process can be significantly simplified. Furthermore, even when a large number of unrecorded areas exist on a disc, a startup processing time when a medium is loaded in the recording apparatus can be reduced since it is sufficient to search for only the and of a recorded area located at the rearmost location in the user data area.

Not only is the location information of a recorded area stored, but also other information (e.g., a defective-area management information and apparatus-adjustment parameters, such as recording power) can be stored in the recorded-area-location storage area.

Second Embodiment

Next, an embodiment of the additionally recordable information recording medium according to the present invention will be described with reference to FIG. 11.

An additionally recordable information recording medium 1100 includes a first layer (recording layer) and a second layer (recording layer). The first layer includes a lead-in area 1101, a user data area 1102, and an intermediate area 1103. The second layer includes an intermediate area 1103, a user data area 1104, and a lead-out area 1105. The lead-in area 1101 and the lead-out area 1105 are control information areas for recording a control information. The additionally recordable information recording medium 1100 is capable of randomly accessing the user data areas 1102 and 1104.

Figure 11:
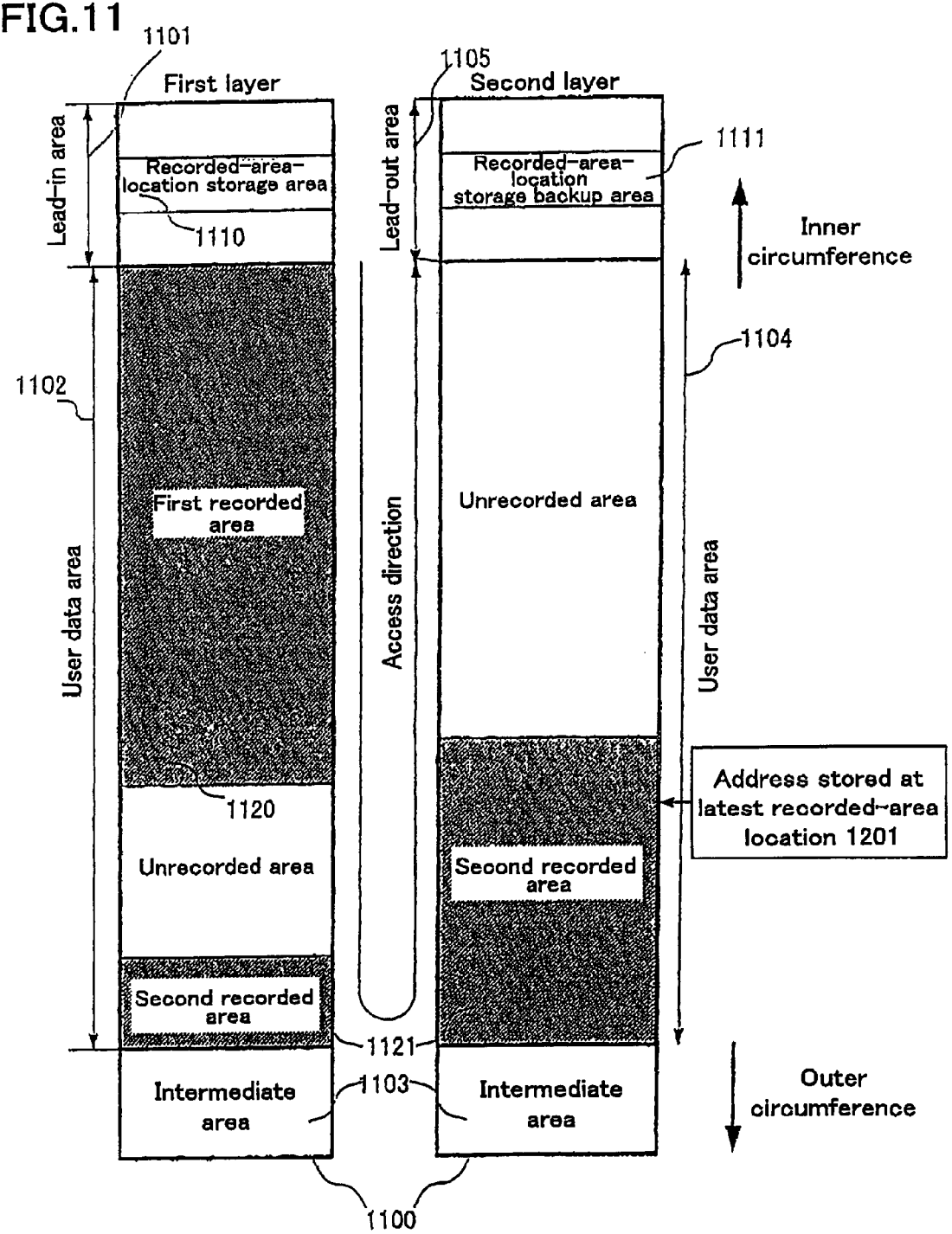
FIG. 11 is an explanation drawing illustrating a data structure of an additionally recordable information recording medium having two layers according to the present invention.

In the example shown in FIG. 11, the direction of accessing the user data areas 1102 and 1104 is a direction from the lead-in area 1101 toward the intermediate area 1103 in the first layer and a direction from the intermediate area 1103 toward the lead-out area 1105 in the second layer. The user data areas 1102 and 1104 are defined as a single user data area that virtually continues across the first layer the second layer.

Access to the user data areas 1102 and 1104 (e.g., recording of a user data to the user data areas 1102 and 1104 or reproducing of user data recorded in the user data areas 1102 and 1104) is performed along the access direction of the user data areas 1102 and 1104.

The method for accessing the user data areas shown in FIG. 11 is generally called an "opposite track path (OTP)".

The lead-in area 1101 includes a recorded-area-location storage area 1110. The lead-out area 1105 includes a recorded-area-location storage backup area 1111.

Every time a new recorded area is generated in the user data areas 1102 and 1104, the recording apparatus determines whether or not to update a recorded-area location in the recorded-area-location storage area 1101. When an unrecorded area exists between the last recorded area and a new recorded area in the user data area, the recording apparatus determines that the recorded-area location is to be updated. Otherwise, the recording apparatus determines that the recorded-area location is not to be updated. The recorded-area location is updated by recording a latest recorded-area location indicating the location of a recorded area located at the rearmost location in the user data areas 1102 and 1104, of at least one recorded area in the user data areas 1102 and 1104 in the recorded-area-location storage area 1101. In this case, the latest recorded-area location is arranged immediately prior to the border between the recorded area and the unrecorded area in the recorded-area-location storage area 1101.

Every time the recorded-area location is updated, an available area (an unrecorded area) in the recorded-area-location storage area 1110 is consumed due to characteristics of the additionally recordable information recording medium. When the entire area in the recorded-area-location storage area 1110 is used and depleted, a recorded-area-location storage backup area 1111 is used to compensate for the area shortage in the recorded-area-location storage area 1110.

Figure 12A:
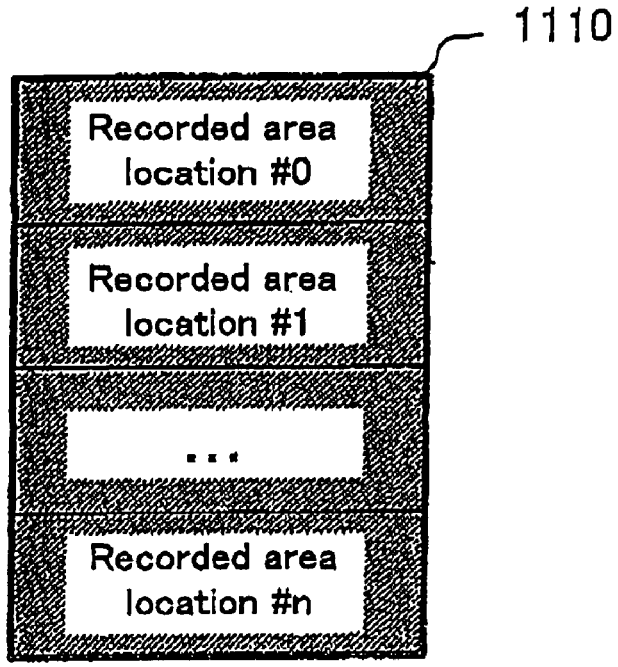
FIGS. 12A and 12D are explanation drawings illustrating a method for managing a recorded-area location on the additionally recordable information recording medium having two layers according to the present invention.
Figure 12B:
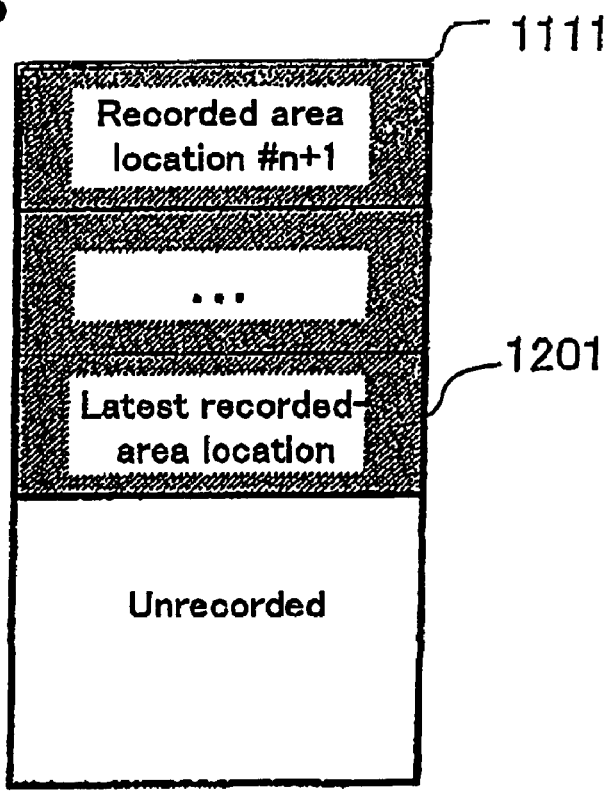

FIG. 12A shows a state in which the entire area in the recorded-area-location storage area 1110 in the first layer is used. FIG. 12B shows a state in which a portion of the area in the recorded-area-location storage backup area 1111 in the second layer is used to compensate for the area shortage in the recorded-area-location storage area 1110 in the first layer.

Every time the recorded-area location is updated, a new recorded-area location is recorded in the recorded-area-location storage area 1110. For the (n+1)th update of the recorded-area location, when a recorded-area location #n is recorded in the recorded-area-location storage area 1110, the recorded-area-location storage area 1110 is depleted. Thus, during the next update (i.e., the (n+2)th update of the recorded-area location), a recorded-area location #n+1 is recorded in the start area in the recorded-area-location storage backup area 1111, which is a backup area. For every subsequent update, a new recorded-area location is additionally recorded in the recorded-area-location storage backup area 1111.

In the example shown in FIG. 11, two recorded areas, namely, a first recorded area 1120 and a second recorded area 1121, exist in the user data areas 1102 and 1104. Although the additionally recordable information recording medium 1100 is a medium physically including two recording layers, the recording apparatus accesses the user data areas 1102 and 1104 by regarding that a single virtually-continuous user data area exists along the access direction and updates the recorded area location in the recorded-area-location storage area 1110 (or the recorded-area-location storage backup area 1111).

In the case of the additionally recordable information recording medium 1100, in terms of the access direction, the second recorded area 1121 located across the first layer and the second layer is behind the first recorded area 1120 located at the first layer. Thus, the latest recorded-area location stored in the recorded-area-location storage area 1110 (or the recorded-area-location storage backup area 1111) indicates the location of the second recorded area 1121.

In this manner, in the additionally recordable information recording medium 1100, the latest recorded-area location indicating the location of a recorded area located at the rearmost location in the user data areas, of at least one recorded area in the user data areas, is stored in the recorded-area-location storage area 1110 (or the recorded-area-location storage backup area 1111). This makes it possible to easily search for the end of a recorded area located at the rearmost location in the user data areas.

Information indicating a recorded area other than the recorded area located at the rearmost location in the user data areas is not stored in either the recorded-area-location storage area 1110 or the recorded-area-location storage backup area 1111. In this manner, only one pointer indicating a recorded area in the user data areas is sufficient for the user data areas.

Also, arranging the VAT structure described with reference to FIGS. 8 and 9A to 9C at the end of a recorded area (or a location adjacent to the end) allows for management of a recorded directory and file data. In addition, since the RZone management is not required unlike the DVD-R described in the related art, the recording process can be significantly simplified. Furthermore, even when a large number of unrecorded areas exist on a disc, a startup processing time when a medium is loaded in the recording apparatus can be reduced since it is sufficient to search for only the end of a recorded area located at the rearmost location in the user data areas.

Also, since the areas capable of storing the recorded-area location are provided in multiple layers, more frequent update of the recorded-area location can be achieved. As a result, the recorded-area location can always be maintained adjacent to the end of a recorded area, so that the time required for searching for the end of the recorded area can be reduced. Also, even when a retry is executed many times even in a case where a recording error occurs during an updating process for the recorded-area location, reliability can be improved since the possibility of depletion of the recorded-area-location storage area is reduced. Furthermore, for example, even when a recording error occurs at the first layer during an updating processing for the recorded-area location due to a characteristic abnormality of the first-layer recording film, the reliability can be improved since the second layer includes the recorded-area-location storage backup area 1111.

In the present embodiment, a case in which the number of recording layers is two has been described. However, needless to say, even for a multilayer medium having three or more layers, it is possible to manage the location of a recorded area located at the rearmost location in the user data areas along the access direction.

In the present invention, a case in which the access direction is the OTP has been described. Needless to say, with respect to the parallel track path (PTP) in which the access direction for the second layer is a direction from the inner circumference toward the outer circumference, it is also possible to manage the location of a recorded area located at the rearmost location in the user data areas along the access direction as in the case of the OTP.

In the present embodiment, a recorded area is managed by regarding a disc having two recording layers as a disc having a single user data area that virtually continues along the access direction. When a recorded area is managed by respectively regarding a disc having two recording layers as different discs for each recording layer, the recorded-area-location storage backup area 1111 may be used as a recorded-area-location storage area in the second layer, instead of being used as the a backup area for the recorded-area-location storage area 1110 in the first layer. This makes it possible to individually manage a recorded area in the first layer and a recorded area in the second layer.

As information indicating a recorded-area location, any information capable of identifying a location on a disc (e.g., a physical address typically used for a disc storage medium) can be used. The recorded area location may also include a layer number for identifying a recorded layer.

Not only is the location information of a recorded area stored, but also other information (e.g., defective-area management information and apparatus-adjustment parameters, such as recording power) can be stored in the recorded-area-location storage area.

Third Embodiment

Next, an embodiment of an information recording/reproducing apparatus according to the present invention will be described.

Figure 13:
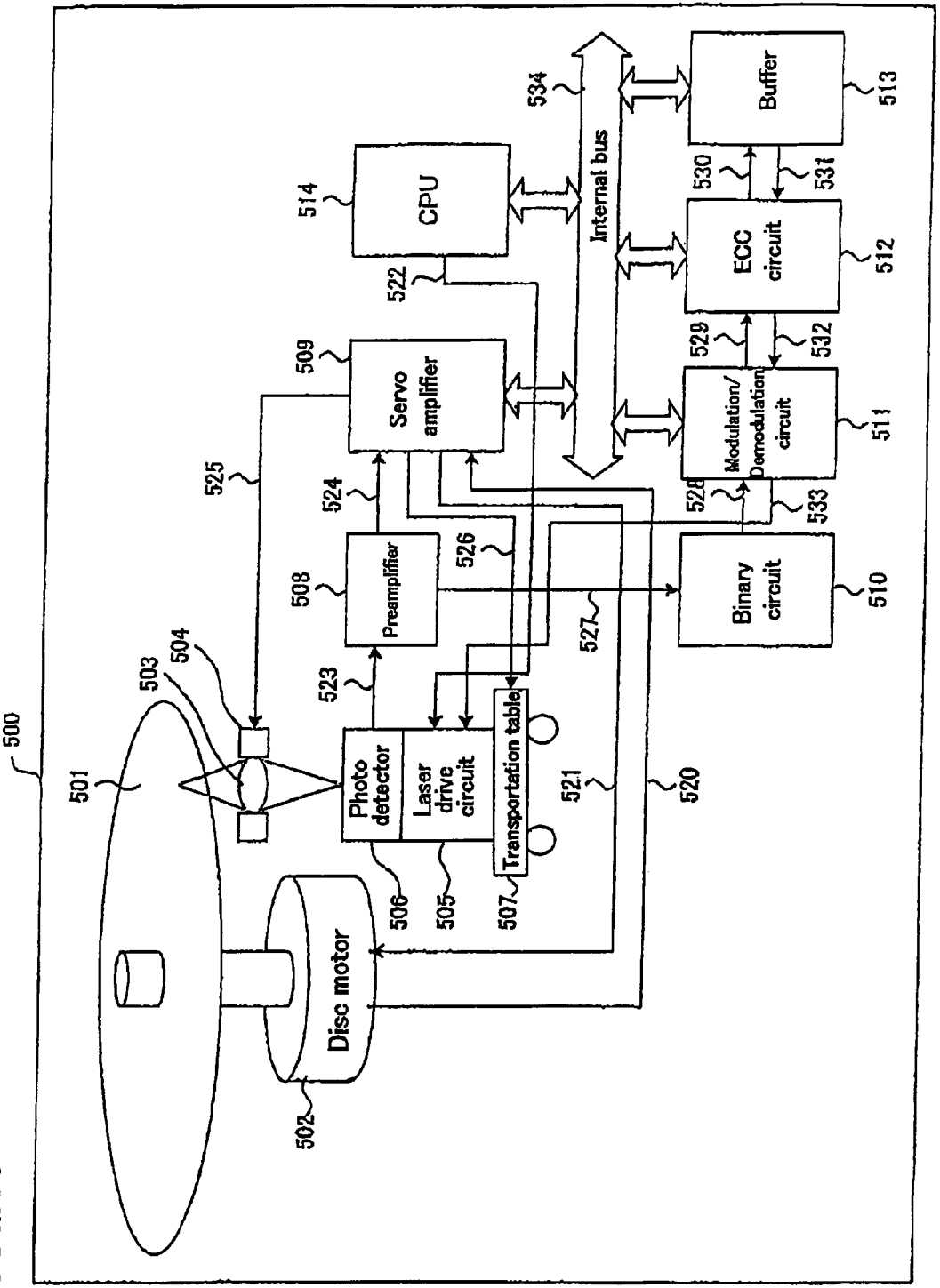
FIG. 13 is a block diagram showing one example of the configuration of an information recording/reproducing apparatus according to the present invention.

FIG. 13 is a block diagram showing one example of the configuration of an information recording/reproducing apparatus 500 according to an embodiment of the present invention. The information recording/reproducing apparatus 500 is capable of randomly accessing a user data area of an additionally recordable information recording medium (i.e., capable of recording the user data in a user data area in a random access mode or reproducing a user data recorded in a user data area in the random access mode). For example, as the additionally recordable information recording medium, the additionally recordable information recording medium 1000 described in the first embodiment or the additionally recordable information recording medium 1100 described in the second embodiment 2 can be used.

Hereafter, a case in which the additionally recordable information recording medium is an optical disc 501 will be described as an example.

The information recording/reproducing apparatus 500 includes an optical head device for emitting a light to the optical disc 501 and detecting the light reflected from the optical disc 501. The optical head device includes a lens 503, an actuator 504 for actuating the lens 503, a photodetector 606, a laser drive circuit 505 and a transportation table 507.

The information recording/reproducing apparatus 500 further includes a disc motor 502, a preamplifier 508, a servo circuit 509, a binary circuit 510, a modulation/demodulation circuit 511, an ECC circuit 512, a buffer 513, a CPU 514 and an internal bus 534. The servo circuit 509, the modulation/demodulation circuit 511, the ECC circuit 512, the buffer 513 and the CPU 514 are interconnected through the internal bus 534.

In FIG. 13, a reference numeral 520 denotes a rotation detection signal, 521 a disc-motor drive signal, 522 a laser-emitting permission signal, 523 a photo-detection signal, 524 a servo error signal, 525 an actuator drive signal, 526 a transportation-table drive signal, 527 an analog data signal, 528 a binary data signal, 529 a demodulation data signal, 530 a correction data signal, 531 a storage data signal, 532 an coding data signal and 533 a modulation data signal.

In accordance with an internal control program, the CPU 514 controls the entire operation of the information recording/reproducing apparatus 500 through the internal bus 534.

In response to the laser-emitting permission signal S22 from the CPU 512, the laser drive circuit 505 emits a laser light.

The light reflected from the optical disc 501 converted by the photodetector 506 into the photo-detection signal 523, which is then subjected to addition/subtraction by the preamplifier 508, thereby providing the servo error signal 524 and the analog data signal 527.

The analog data signal 527 is subjected to A/D (analog/digital) conversion by the binary circuit 510 to provide the binary data signal 528. The binary data signal 528 is then demodulated by the modulation/demodulation circuit 511 to provide the demodulation data signal 529. Next, the demodulation data signal 529 is converted by the ECC circuit 512 into the error-free correction data signal 530, which is then stored in the buffer 513.

The servo error signal 524 is fed back as the actuator drive signal 525 from the servo circuit 509 to the actuator 504 and is used for tracking control and focusing control for the lens 503.

The ECC circuit 512 adds an error correction code to the storage data signal 531 which is an output of data stored in the buffer 513 to provide the coding data signal 532. Next, the coding data signal 532 is modulated by the modulation/demodulation circuit 511 to provide the modulation data signal 533. Furthermore, the modulation data signal 533 is input to the laser drive circuit 505, so that the power of the laser light is modulated.

When the information recording/reproducing apparatus 500 is used as a computer peripheral apparatus, such as a DVD-ROM drive, a host interface circuit (not shown) is added to the configuration shown in FIG. 13. Data is exchanged between a host computer (not shown) and the buffer 513 via a host interface bus (not shown), such as a SCSI (Small Computer System Interface).

When the information recording/reproducing apparatus 500 is used as a consumer equipment, such as a DVD player, an AV decoder/encoder circuit (not shown) for decompressing or compressing a compressed moving image or audio is added to the configuration shown in FIG. 13. Data is exchanged between the AV decoder/encoder circuit and the buffer 513.

Next, the operation of the information recording/reproducing apparatus 500 when the additionally recordable information recording medium (hereinafter simply referred to as a "disc") according to the first or second embodiment is loaded in the information recording/reproducing apparatus 500 will be described.

Figure 14:
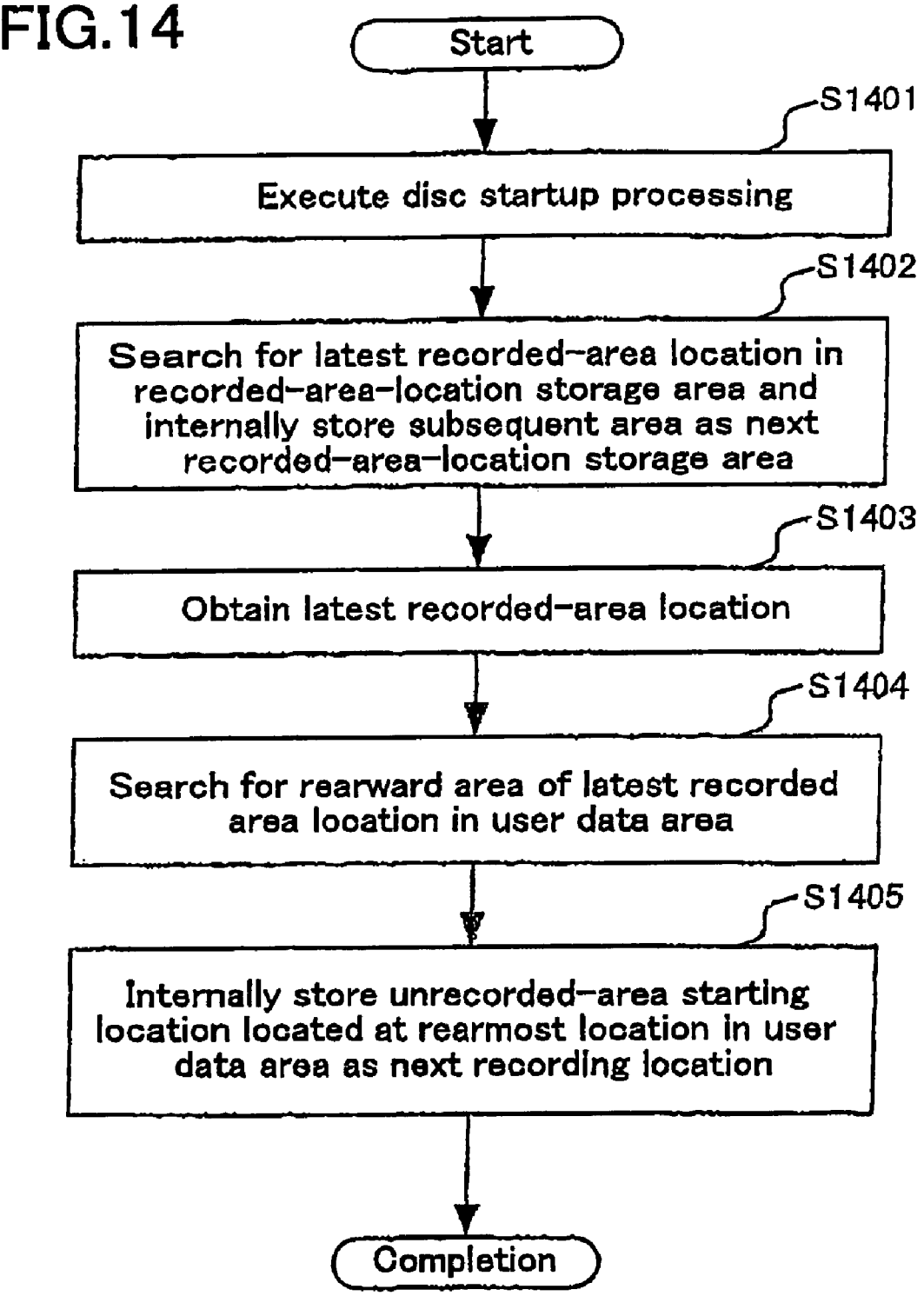
FIG. 14 is a flowchart illustrating a process procedure at the time of disk startup in the information recording/reproducing apparatus according to the present invention.

FIG. 14 is a flowchart showing the procedure of process performed by the information recording/reproducing apparatus 500.

Upon detecting that the disc has been loaded, the CPU 514 of the information recording/reproducing apparatus 500 issues an instruction to the servo circuit 509 to start to rotate the disc motor 502 at a predetermined speed so that data on the disc can be read. During the startup processing, the servo circuit 509 identifies whether the loaded disc is a single-layer disc or a two-layer disc and reports the identification result to the CPU 514 (step S1401).

After the startup of the disc is completed, the CPU 514 issues an instruction to the servo circuit 509 to move the optical head device in order to search for the end of a recorded area in the recorded-area-location storage area (i.e., the boundary between the recorded area and the unrecorded area in the recorded-area-location storage area). After moving the optical head device to the recorded-area-location storage area, the servo circuit 509 checks a reflection light returned from the preamplifier 508 to determine a recorded area and an unrecorded area. This determining operation is performed while the optical head device is moved in an access direction. Thereby the end of a recorded area is detected.

The CPU 514 stores the start location of an unrecorded area immediately subsequent to the recorded area detected in the recorded-area-location storage area as the "next recorded-area-location storage location" in an internal memory (not shown). The internal memory is, for example, a memory in the CPU 514. The next recorded-area-location storage area refers to a location at which the latest recorded-area location is recorded when the recorded-area location in the recorded-area-location storage area is updated next time.

When it is determined in stop S1401 that the loaded disc is a two-layer disc, the above-described detecting process for the end of a recorded area is started from the first layer. As a result of the searching, when it is determined that the entire recorded-area-location storage area in the first layer is a recorded area, the actuator 504 is controlled to move the focus of the optical head device to the second layer. Subsequently, in the same manner, searching for the recorded-area-location storage backup area is performed (step S1402).

The CPU 514 determines that an area immediately prior to the next recorded-area-location storage location obtained in step S1402 is the current latest recorded-area location and controls the modulation/demodulation circuit 511 and the ECC circuit 512 to perform reproducing process on the latest recorded-area location. The reproduced data is stored in the buffer 513 (step S1403).

The CPU 514 refers to the latest recorded-area location stored in the buffer 513, and executes the searching for the end of a recorded area with respect to an area behind the latest recorded-area location in the user data areas. The searching process for the end of a recorded area is similar to that already described in step S1402. However, when a loaded disc is a two-layer disc and it is determined that the entire area is a recorded area even though the searching is performed to the end of the first layer, the searching process for the end of a recorded area in the second layer is continued along the access direction. The VAT structure which has been described with reference to FIGS. 8 and 9A to 9C is recorded at the end of a recorded area. Generally, the CPU 514 reports the location of the end of a recorded area to a high-order controlling means (e.g., a host computer). Upon receiving the report, the high-order controlling means issues a request for reproducing the location of the end of the recorded area to obtain a file management information (step S1404).

The CPU 514 stores, in the internal memory, the start location of an unrecorded area immediately subsequent to the end of the recorded area detected in step S1404 as a "next recording location" representing a next user-data additionally recordable location (step S1405).

In this manner, the CPU 514 functions as means for obtaining the latest recorded-area location stored in the recorded-area-location storage area by executing step 1403. The CPU 514 also functions as means for searching for the end of a recorded area located at the rearmost location in the user data areas based on the latest recorded-area location by executing step 1404.

The process procedure when the disc is loaded has been described.

As described above, according to the process procedure when the disc is loaded in the present embodiment, since there is no management information for RZones or the like in the conventional DVD-R, the process procedure can be simplified. In addition, in the case of the conventional DVD-R, the searching process for the end of a recorded area in the user data area needs to be executed as many times as the number of Rzones. However, according to the present embodiment, it is sufficient to perform the searching process for the end of a recorded area only once no matter how many unrecorded areas exist in the user data areas, so that the startup processing after a disc has been loaded can be executed in a short period of time.

Next, an operation of the information recording/reproducing apparatus 500 will be described when the information recording/reproducing apparatus 500 records a user data on a disc.

Figure 15:
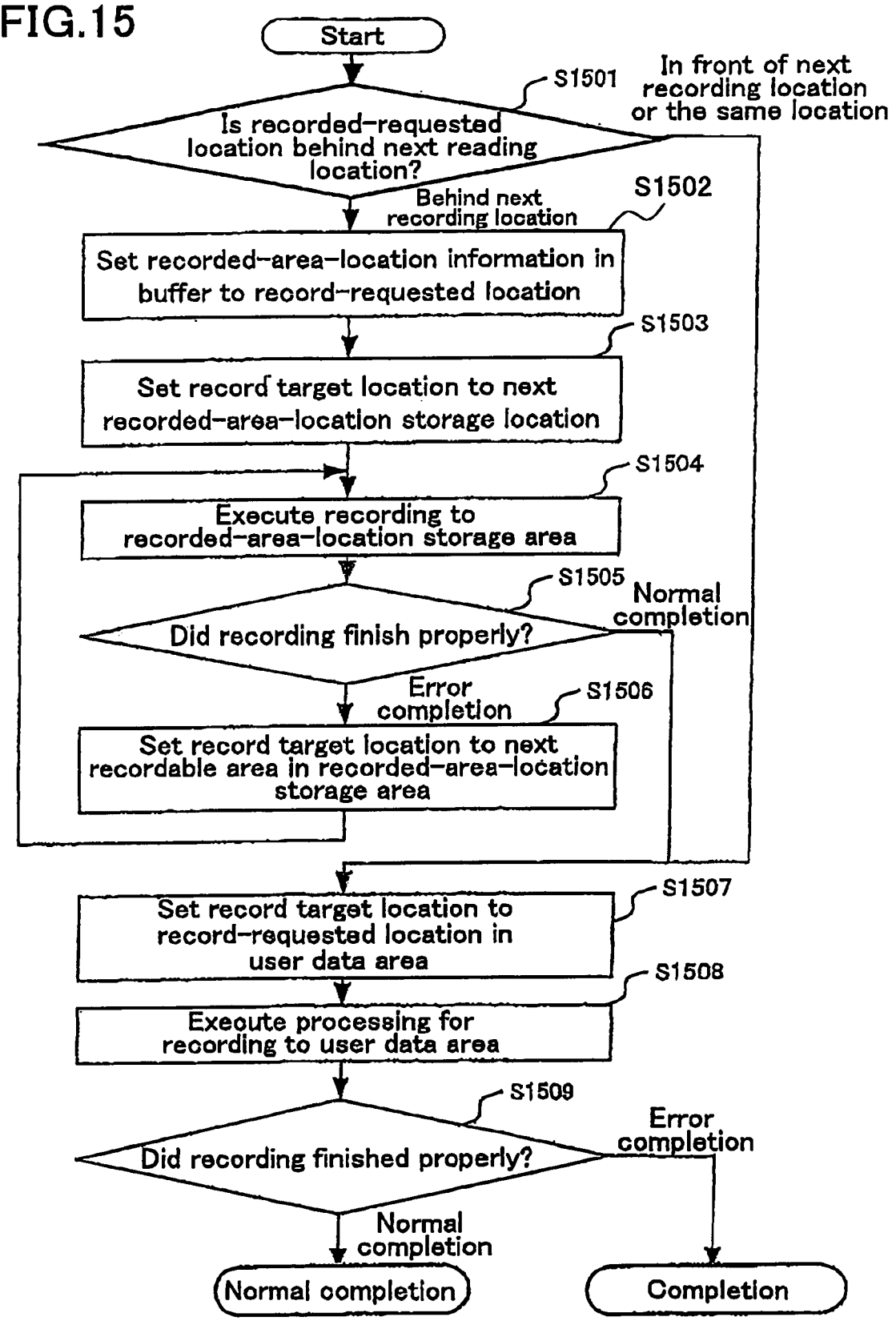
FIG. 15 is a flowchart illustrating process procedure of a recording process for a user data in the information recording/reproducing apparatus according the present invention.

FIG. 15 is a flowchart showing a process procedure performed by the information recording/reproducing apparatus 500. For recording the user data, a high-order controlling means such as a personal computer issues a location (a record-requested location) on a disc on which the user data is to be recorded and an instruction indicating a recording length as control information and transfers the user data to be recorded.

The CPU 514 determines whether or not the record-requested location received from the high-order controlling means is located behind the next recording location stored in the internal memory. The next recording location represents the starting location of the rearmost unrecorded area in the user data areas. Thus, when the record-requested location is located behind the next recording location, this means that a new recorded area is created to recording areas with an unrecorded area sandwiched therebetween. When it is determined that the record-requested location is located behind the next recording location, the process branches to step S1502 for updating the recorded-area location. When the record-requested location is located in the front of or is the same as the next recording location, the process branches to step S1507 for recording the user data (step S1501).

The CPU 514 overwrites the recorded-area location information stored in the buffer 513 to the record-requested location received from the high-order controlling means to update (step S1502).

In preparation for a recording process, the CPU 514 issues, to the servo circuit 509 and the ECC circuit 512, an instruction indicating the next recorded-area-location storage location as a target location for recording. Herein, the next recorded-area-location storage location is stored in the internal memory in step S1402 shown in FIG. 14 and indicates the start location of an unrecorded area in the recorded-area-location storage area (step S1503).

The CPU 514 causes the servo circuit 509 and the ECC circuit 512 to start the recording process for the recorded-area-location and receives a process result (step S1504).

When the result of the recording process indicates a normal completion, the CPU 514 causes the process to branch to step S1507 so as to shift to the recording process for the user data. When the recording process fails, the process branches to step S1506 (stop S1505).

When the update of the recorded-area location fails, the CPU 514 resets, as a recording target location, an area subsequent to the area to which the recording failed, in order to attempt the recording to the area subsequent to the recorded-area-location storage area. When the loaded disc is a two-layer disc and the recorded-area-location storage area in the first layer is entirely used, the CPU 514 resets the recorded-area-location storage area start location in the second layer, as the recording target location (step S1506).

In order to record the user data received from the high-order controlling means, the CPU 514 sets, in the servo circuit 509 and the ECC circuit 512, the record-requested location as the record target location (step S1507).

The CPU 514 causes the servo circuit 509 and the ECC circuit 512 to start the recording process and receives a process result after the completion of the recording process (step S1508).

The CPU 514 performs determination on the received recording-process result and finishes the process as a normal completion when determining that the recording finished properly. On the other hand, the CPU 514 finishes the process as an error completion when determining that the recording has finished with error (step S1509).

The recording process for a user data has been described.

As described above, by executing step S1501, the CPU 514 functions as a determining means for determining whether or not the recording of the user data is started from a predetermined location rearwardly away from the end of a recorded area located at the rearmost location in the user data areas, of at least one recorded area in the user data areas, before recording the user data in the user data areas. When steps S1502 to S1509 are executed and it is determined that the recording of the user data is started at a predetermined location rearwardly away from the end of a recorded area located at the rearmost location in the user data areas, the CPU 514 records the user data from the predetermined location and functions as a updating means for updating the latest recorded-area location indicating the location of a recorded area located at the rearmost location in the user data areas.

Although the information recording/reproducing apparatus 500 has been described as an example in the present embodiment, this does not mean that the provision of both the recording function and reproducing function is essential to achieve the present invention.

An apparatus including the CPU 514 for executing the steps shown in FIG. 14 may have at least the reproducing function and does not necessarily require the recording function. Thus, an apparatus including the CPU 514 for executing the steps shown in FIG. 14 is encompassed by the scope of the present invention, regardless of the presence/absence of the recording function. Such an apparatus may be a reproduction-only apparatus having only the reproducing function or may be a recording/reproducing apparatus having both the recording function and the recording function.

An apparatus including the CPU 514 for executing the steps shown in FIG. 15 may have at least the recording function and does not necessarily require the reproducing function. Thus, an apparatus including the CPU 514 for executing the steps shown in FIG. 15 is encompassed by the scope of the present invention, regardless of the presence/absence of the reproducing function. Such an apparatus may be a recording-only apparatus having only the recording function or may be a recording/reproducing apparatus having both the recording function and the reproducing function.

As described above, upon receiving a request for performing recording to an area behind the next recording location, the information recording/reproducing apparatus of the present embodiment performs a process for updating the recorded-area location. In other words, upon receiving a request for recording to an area so that the area and the rearmost recorded area in the user data areas sandwich an unrecorded area, the information recording/reproducing apparatus executes a process for updating the recorded-area location. Thus, an unrecorded area sandwiched between recorded areas does not exist behind a location indicated by the latest recorded-area location. That is, during the searching process for the end of a recorded area when the disc is loaded, it is possible to always search for the rearmost recorded area. In addition, the information recording/reproducing apparatus of the present embodiment does not require a data management structure such as an RZone in the conventional DVD-R, thereby making it possible to construct a simple system. Managing only the rearmost recorded area on the disc makes it possible to reduce the search time of a recorded area during the startup. In addition, since the recorded-area-location storage backup area in the second layer is used when the recorded-area-location storage area in the first layer is depleted, the reliability of the disc can be improved.

In the present embodiment, the recorded-area location is updated prior to the recording process for a user data but, needless to say, may be updated after the completion of the recording process for the user data.

In the present embodiment, the recorded-area location is updated only when a request for recording to an area behind the next recording location. The recorded-area location may be updated at least during the recording to an area behind the next recording location and, needless to say, may be updated more frequently. For example, when the user data having a predetermined amount or more is recorded, when an instruction from the high-order controlling means is not received for a predetermined amount of time or more, or when an instruction for recording that uses another recording layer in a multilayer disc is received, the recorded-area location may be updated.

In the present embodiment, a case in which only the recorded-area location is stored in the recorded-area-location storage area has been described. The recorded-area-location storage area may be, for example, used to store a defect-management information for managing a defective area on the disc and an apparatus-adjustment parameter information for managing an adjustment value for the recording power or the like. In such a case, when a new defective area is detected or when the apparatus-adjustment parameter information is updated, the recorded-area location may be updated.

INDUSTRIAL APPLICABILITY

The additionally recordable information recording medium according to the present invention does not require a data management structure such as an RZone in the conventional DVD-R, thus making it possible to achieve a simple management.

The additionally recordable information recording medium according to the present invention can reduce the number of recorded-area-end searching processes executed during the startup, thus making it possible to speed up the apparatus startup processing.

The additionally recordable information recording medium according to the present invention has the backup area for storing a recorded-area location in a multilayer medium, thus making it possible to improve the reliability.

The information reproducing method according to the present invention minimizes the number of recorded-area-end search operations for an additionally recordable information recording medium, thus making it possible to realize a high-speed disc startup.

The information reproducing method according to the present invention does not use a special unrecorded-area management method as used in the conventional additionally recordable-medium information reproducing method, thus simplifying a system and facilitating the development/manufacture of an apparatus.

The information recording method according to the present invention can manage the rearmost recorded area in a user data area as a recorded-area location, thereby making it possible to always detect a recorded-area end when the end of a recorded area is searched during the startup.

The invention claimed is:

1. An information recording method for recording data on an additionally recordable information recording medium having a plurality of recording layers, each of the plurality of recording layers including a user data area for recording a user data, a predetermined recording layer, which is one of the plurality of recording layers, having a recorded-area-location storage area for storing a last recorded address indicating an address of a recorded area located at the rearmost location in the user data area, and at least one recording layer other than the predetermined recording layer, having a recorded-area-location storage backup area for compensating for a shortage in the recorded-area-location storage area, wherein each of the recorded-area-location storage area and the recorded-area-location storage backup area is located at an inner circumference area of the user area, the information recording method comprising:

a step of determining whether it is necessary to update the last recorded address or not; and a step of updating the last recorded address to an address of a rearmost area in the user data area, in which the user data is recorded, wherein in the event at least one unrecorded area is located in a forward direction from the last recorded address, the step of determining determines that it is not necessary to update the last recorded address if the user data is recorded in the at least one unrecorded area, and determines that it is necessary to update the last recorded address if the user data is recorded in an area rearwardly away from the last recorded address, the step of updating records the last recorded address in the recorded-area-location storage backup area when a shortage of an area for storing the last recorded address occurs in the recorded-area-location storage area.

2. An additionally recordable information recording medium, on which data is recorded by the information recording method according to claim 1, comprising:

a plurality of recording layers, wherein:

each of the plurality of recording layers includes a user data area for recording a user data;

a predetermined recording layer, which is one of the plurality of recording layers, includes a recorded-area-location storage area for storing a last recorded address indicating an address of a recorded area located at the rearmost location in the user data area;

at least one recording layer other than the predetermined recording layer, has a recorded-area-location storage backup area for compensating for a shortage in the recorded-area-location storage area;

each of the recorded-area-location storage area and the recorded-area-location storage backup area is located at an inner circumference area of the user area; and the recorded-area-location storage backup area is an area in which the last recorded address is recorded when a shortage of an area for storing the last recorded address occurs in the recorded-area-location storage area.

3. An information reproducing method for reproducing data recorded on the additionally recordable information recording medium according to claim 2, the information reproducing method comprising steps of:

reproducing the last recorded address stored in the recorded-area-location storage area; and reproducing the last recorded address stored in the recorded-area-location storage backup area, when a shortage of an area for storing the last recorded address occurs in the recorded-area-location storage area and the last recorded address has recorded in the recorded-area-location storage backup area.

4. An information recording apparatus for recording data on an additionally recordable information recording medium having a plurality of recording layers, each of the plurality of recording layers including a user data area for recording a user data, a predetermined recording layer, which is one of the plurality of recording layers, having a recorded-area-location storage area for storing a last recorded address indicating an address of a recorded area located at the rearmost location in the user data area, and at least one recording layer other than the predetermined recording layer, having a recorded-area-location storage backup area for compensating for a shortage in the recorded-area-location storage area, wherein each of the recorded-area-location storage area and the recorded-area-location storage backup area is located at an inner circumference area of the user area, the information recording apparatus comprising:

a determining means for determining whether it is necessary to update the last recorded address or not; and an updating means for updating the last recorded address to an address of a rearmost area in the user data area, in which the user data is recorded, wherein in the event at least one unrecorded area is located in a forward direction from the last recorded address, the determining means determines that it is not necessary to update the last recorded address if the user data is recorded in the at least one unrecorded area, and determines that it is necessary to update the last recorded address if the user data is recorded in an area rearwardly away from the last recorded address, and the updating means records the last recorded address in the recorded-area-location storage backup area when a shortage of an area for storing the last recorded address occurs in the recorded-area-location storage area.

5. An additionally recordable information recording medium, on which data is recorded by the information recording apparatus according to claim 4, comprising:

a plurality of recording layers, wherein:

each of the plurality of recording layers includes a user data area for recording a user data;

a predetermined recording layer, which is one of the plurality of recording layers, includes a recorded-area-location storage area for storing a last recorded address indicating an address of a recorded area located at the rearmost location in the user data area;

at least one recording layer other than the predetermined recording layer, has a recorded-area-location storage backup area for compensating for a shortage in the recorded-area-location storage area;

each of the recorded-area-location storage area and the recorded-area-location storage backup area is located at an inner circumference area of the user area; and the recorded-area-location storage backup area is an area in which the last recorded address is recorded when a shortage of an area for storing the last recorded address occurs in the recorded-area-location storage area.

6. An information reproducing apparatus for reproducing data recorded on the additionally recordable information recording medium according to claim 5, comprising:

a section for reproducing the last recorded address stored in the recorded-area-location storage area, and a section for reproducing the last recorded address stored in the recorded-area-location storage backup area, when a shortage of an area for storing the last recorded address occurs in the recorded-area-location storage area and the last recorded address has recorded in the recorded-area-location storage backup area.

* * * * *